(12) United States Patent
Murray, IV et al.

(10) Patent No.: US 7,076,336 B2
(45) Date of Patent: Jul. 11, 2006

(54) HARDWARE ABSTRACTION LAYER (HAL) FOR A ROBOT

(75) Inventors: Thomas J. Murray, IV, Fullerton, CA (US); Baoquoc N. Pham, Pasadena, CA (US); Paolo Pirjanian, Glendale, CA (US)

(73) Assignee: Evolution Robotics, Inc., Pasadena, CA (US)

( * ) Notice: Subject to any disclaimer, the term of this patent is extended or adjusted under 35 U.S.C. 154(b) by 0 days.

(21) Appl. No.: 10/924,100

(22) Filed: Aug. 23, 2004

(65) Prior Publication Data

US 2005/0021186 A1    Jan. 27, 2005

Related U.S. Application Data

(62) Division of application No. 10/307,199, filed on Nov. 27, 2002, now Pat. No. 6,889,118.

(60) Provisional application No. 60/374,309, filed on Apr. 19, 2002, provisional application No. 60/355,624, filed on Feb. 8, 2002, provisional application No. 60/334,142, filed on Nov. 28, 2001.

(51) Int. Cl.
*G05B 1/18* (2006.01)
*G05B 1/19* (2006.01)

(52) U.S. Cl. ............. 700/250; 700/245; 700/253; 700/257; 318/568.11; 318/568.13; 318/568.22; 901/1; 901/5; 901/15

(58) Field of Classification Search ........ 700/245–247, 700/250, 253, 257; 901/1, 5, 11; 436/43; 318/568.11, 568.13, 568.22
See application file for complete search history.

(56) References Cited

U.S. PATENT DOCUMENTS

| 5,691,897 | A | 11/1997 | Brown et al. |
| 5,832,189 | A | 11/1998 | Tow |
| 5,867,385 | A | 2/1999 | Brown et al. |
| 6,038,493 | A | 3/2000 | Tow |
| 6,078,747 | A | 6/2000 | Jewitt |
| 6,209,037 | B1 | 3/2001 | Brown et al. |
| 6,470,235 | B1 | 10/2002 | Kasuga et al. |
| 6,480,896 | B1 | 11/2002 | Brown et al. |
| 6,513,058 | B1 | 1/2003 | Brown et al. |
| 6,516,236 | B1 | 2/2003 | Brown et al. |

(Continued)

OTHER PUBLICATIONS

Feritta et al., Developing portable test program sets in a graphical design environment, 1997, IEEE, p. 475-487.*

(Continued)

*Primary Examiner*—Thomas G. Black
*Assistant Examiner*—McDieunel Marc
(74) *Attorney, Agent, or Firm*—Andrew Naglestad and Knobbe Martens Olson & Bear LLP

(57) ABSTRACT

Methods and apparatus that provide a hardware abstraction layer (HAL) for a robot are disclosed. A HAL can reside as a software layer or as a firmware layer residing between robot control software and underlying robot hardware and/or an operating system for the hardware. The HAL provides a relatively uniform abstract for aggregates of underlying hardware such that the underlying robotic hardware is transparent to perception and control software, i.e., robot control software. This advantageously permits robot control software to be written in a robot-independent manner. Developers of robot control software are then freed from tedious lower level tasks. Portability is another advantage. For example, the HAL efficiently permits robot control software developed for one robot to be ported to another. In one example, the HAL permits the same navigation algorithm to be ported from a wheeled robot and used on a humanoid legged robot.

15 Claims, 19 Drawing Sheets

U.S. PATENT DOCUMENTS

| | | | |
|---|---|---|---|
| 6,658,325 | B1 | 12/2003 | Zweig |
| 6,668,211 | B1 | 12/2003 | Fujita et al. |
| 6,889,118 | B1 * | 5/2005 | Murray et al. ............... 700/250 |
| 2001/0034559 | A1 | 10/2001 | Brown et al. |
| 2002/0081937 | A1 | 6/2002 | Yamada et al. |
| 2002/0173877 | A1 | 11/2002 | Zweig |
| 2003/0093187 | A1 | 5/2003 | Walker |
| 2003/0109959 | A1 | 6/2003 | Tajima et al. |

OTHER PUBLICATIONS

Takasaki et al., HAL III: Function level hardware logic simulation system, 1990, IEEE, p. 167-170.*

Kagami, et al., Design of real-time large scale robot software platform and its implementation in the remote-brained robot project, 1996, vol. 3, Nov. 4-8, 1996, pp. 1394-1399 vol. 3.

Deltheil, et al., Simulating an optical guidance system for the recovery of an unmanned underwater vehicle, 2000, IEEE, vol. 25, Issue: 4, Oct. 2000, pp. 568-574.

Mack, et al., Design and integration of new software for the Robot Controller Test Station, 1989, IEEE, pp. 866-873, vol. 2.

Vaataja, et al., 3-D simulation of ultrasonic sensor system in mobile robots, 1992, IEEE, pp. 333-336, vol. 1.

Stewart, et al., *Implementing Real-Time Robotic Systems Using CHIMERA II*, IEEE (1990) vol. 1, pp. 598-603.

Pirjanian, "Behavior Coordination Mechanisms—State-of-the-art" *USC Robotics Research Laboratory, University of Southern California, Los Angeles, California* 90089-0781, Oct. 7, 1999.

Kanehiro, et al., "Developmental Software Environment that is applicable to Small-sized Humanoids and Life-size Humanoids", *Proceedings of the 2001 IEEE Conference on Robotics & Automation, Seoul, Korea*, May 21-26, 2001, pp. 4084-4089.

PCT International Search Report with mailing date of Apr. 2, 2004 from corresponding PCT/US02/38280.

* cited by examiner

VARIABLE REFERENCE FOR CODE BLOCK 10

| | |
|---|---|
| $v_l$ | Current velocity of left wheel |
| $v_r$ | Current velocity of right wheel |
| $a_l$ | Current acceleration of left wheel |
| $a_r$ | Current acceleration of right wheel |
| $t_l$ | Completion time (or anticipated completion time) of last move_and_turn command sent to left wheel |
| $t_r$ | Completion time (or anticipated completion time) of last move_and_turn command sesnt to right wheel |
| $t$ | Current time (i.e., now), determined by a system timestamp |
| $v_c$ | Current velocity |
| $\omega_c$ | Current angular velocity |
| $v$ | Desired velocity |
| $\omega$ | Desired angular velocity |
| $r$ | Turning radius |
| $a$ | Desired acceleration |
| $\alpha$ | Desired angular acceleration |

*FIG. 18*

HARDWARE ABSTRACTION LAYER (HAL) FOR A ROBOT

RELATED APPLICATION

This application is a divisional application of U.S. application Ser. No. 10/307,199, filed Nov. 27, 2002 now U.S. Pat. No. 6,889,118, which claims the benefit under 35 U.S.C. § 119(e) of U.S. Provisional Application No. 60/334,142, filed Nov. 28, 2001, Provisional Application No. 60/355,624, filed Feb. 8, 2002, and Provisional Application No. 60/374,309, filed Apr. 19, 2002, the entireties of all of which are hereby incorporated by reference herein.

BACKGROUND OF THE INVENTION

1. Field of the Invention

The invention generally relates to robotics. In particular, the invention relates to a hardware abstraction layer that enhances portability of control or behavior software.

2. Description of the Related Art

Robots can be used for many purposes. For example, robots can be used in industrial applications for repetitive tasks or in hazardous environments, can be configured as toys to entertain, and the like. The hardware for robots and the control software for robots are ever increasing in sophistication. A robot can include a variety of sensors and actuators that are attached to a structure.

One drawback to existing robots and robot software is a lack of transparency for the control software. In existing robots, software is painstakingly adapted to each new robot configuration. For example, in a typical robotic software architecture, the robotic software interacts with the robotic hardware through low-level device drivers. These low-level device drivers are specific to their corresponding hardware devices, and the low-level device drivers support commands and feedback information that are typically sent and received in terms of the hardware device's physical characteristics. For example, a low-level device driver for a drive system motor can receive commands from the robotic software to spin the motor at a specified speed, such as a specified number of revolutions per minute. However, the drive system as a whole can include not only the motor, but gears and wheels as well. Thus, if a change is made to a gear ratio and/or wheel diameter, the software developer may have to revise the robotic software to change the specified number of revolutions per minute such that the robot behaves as desired.

These menial programming changes are time consuming and are inefficient to both software and hardware development of robots. Embodiments of the invention advantageously isolate the robotic software from the robotic hardware and overcome the disadvantages of the prior art.

SUMMARY OF THE INVENTION

Embodiments of the invention are related to methods and apparatus that provide a hardware abstraction layer (HAL) for a robot. A HAL can reside as a software layer or as a firmware layer residing between robot control software and underlying robot hardware and/or an operating system for the hardware. The HAL provides a relatively uniform abstract for aggregates of underlying hardware such that the underlying robotic hardware is relatively transparent to perception and control software, i.e., robot control software. This advantageously permits robot control software to be written in a robot-independent manner.

Developers of robot control software are then freed from tedious lower level tasks. Moreover, portability of the robot control software provides other advantages. For example, the HAL efficiently permits robot control software developed for one robot to be ported to another. In one example, the HAL permits the same navigation algorithm to be ported from a wheeled robot and used on a humanoid legged robot.

One embodiment of the invention includes a hardware abstraction layer (HAL) in a robot software architecture. The HAL can include: software interfaces to higher-level software, wherein the software interfaces are configured to communicate with the higher-level robotic software with real-world measurements relating to robot interaction with an environment; a resource configuration that provides an indication of available resources the higher-level software; a plurality of resource drivers, wherein at least a portion of the resource drivers correspond to the available resources in the resource configuration, wherein at least two of the resource drivers overlap in functionality, where only one of the at least two resource drivers has a corresponding resource available, where a resource driver for an available resource is configured to translate between real-world measurements for the robot and device-level measurements for a device; and an interface to lower-level device drivers, wherein the lower-level device drivers communicate with corresponding hardware at a device level, and where the interface to lower-level device drivers communicates to the higher-level software via a resource driver.

One embodiment of the invention relates to a method in a robot of providing hardware abstraction for robot control software. The method can include: providing a plurality of resource drivers for the robot, where the plurality of resource drivers includes resource drivers for which no corresponding hardware is present on the robot; detecting a hardware configuration for the robot; automatically detecting resources that are available on the robot based on the detected hardware configuration; receiving a request from the robot control software to use a type of resource; automatically selecting a resource from the available resources that corresponds to the type of resource requested by the robot control software; exchanging a first information with the robot control software, where the first information is related to use of the selected resource and is provided in a unit of measure that is related to a robot; exchanging a second information with a low-level device driver corresponding to the resource, where the second information is related to the use requested by the robot control software, where the second information is provided in a unit of measure that is related to a corresponding device, and where the second information is different than the first information; and converting between the first information and the second information based on the detected configuration of the robot.

One embodiment includes a computer-readable medium having computer-executable instructions for performing the method of providing hardware abstraction. The computer-readable medium can correspond to a wide variety of mediums including, but not limited to, hard disks, floppy disks, and other magnetic disks, RAM, ROM, Flash Memory, Memory Cards, and other solid-state memory, optical disks, CD-ROMs, DVD-ROMs, and the like.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 18 is a chart of references for variables for the flowchart depicted in FIG. 17.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

Figure 1A:
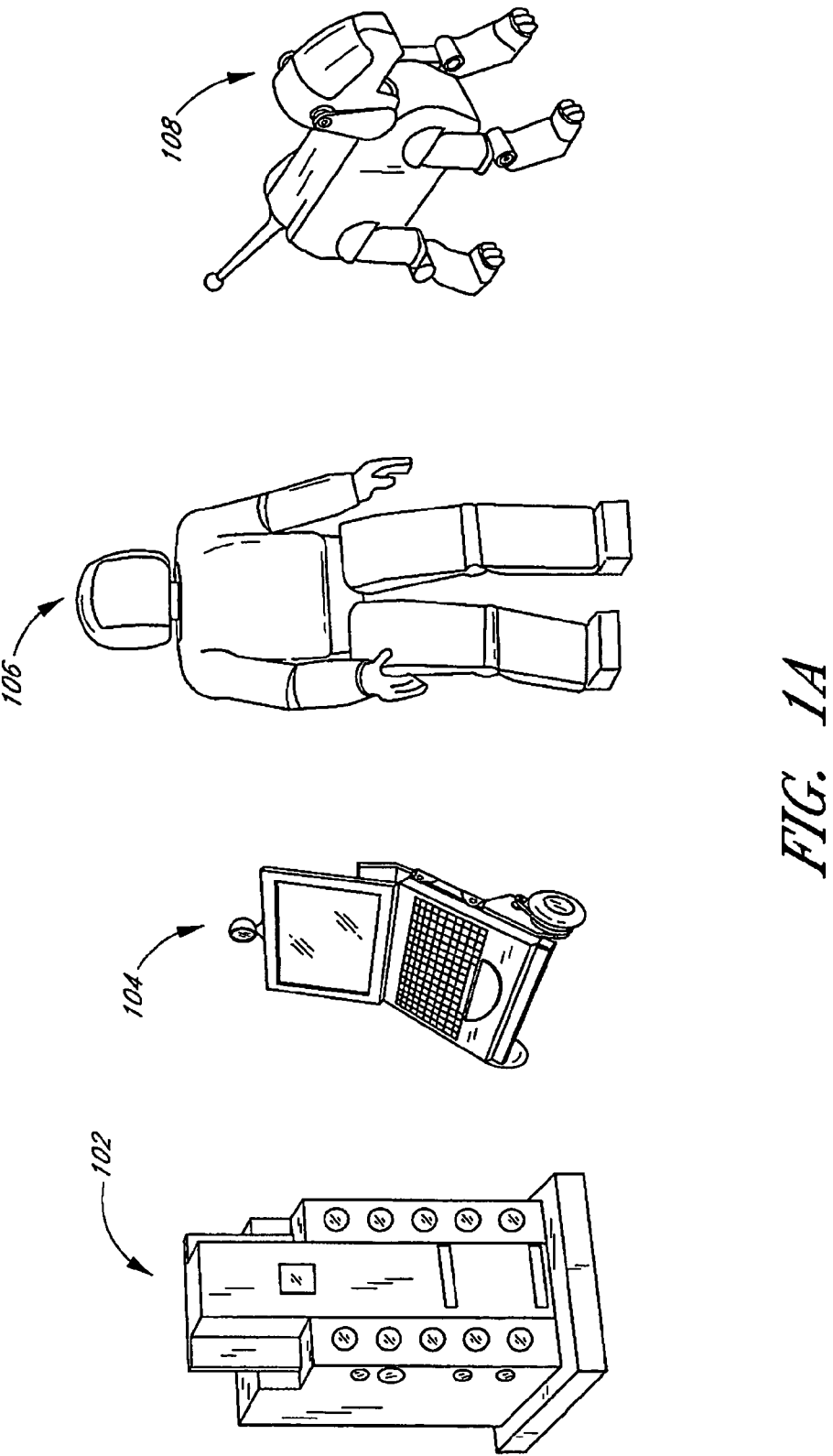
FIG. 1A illustrates a non-exhaustive sampling of a variety of robots that can be used with embodiments of the invention.

FIG. 1A illustrates examples of different types of robots. Robots can be used in a very broad variety of ways and can correspond to a very broad variety of configurations. For example, a first robot 102 can correspond to an automated transport device for medical supplies in a hospital. A second robot 104 can correspond to a robot for research and hobby. A third robot 106 can correspond to a humanoid robot. A fourth robot 108 can correspond to a toy for entertainment purposes. It will be understood by one of ordinary skill in the art that many other configurations for robots are possible.

It will be appreciated that robots of varying configurations can have substantial differences in hardware. For example, the first robot 102 and the second robot 104 move with wheels, whereas the third robot 106 and the fourth robot 108 move using legs. Embodiments of the invention advantageously permit software developed for one robot to be conveniently ported to another robot, even when the underlying hardware is radically different. In addition, embodiments of the invention permit the same software to be used to control a robot when a relatively minor change, such as a change in wheel diameter, is made to the robot.

Embodiments of the invention provide a hardware abstraction layer (HAL) that advantageously permits robotic software to be developed in a hardware-independent manner. The HAL advantageously resides in a layer in the software architecture between the robotic software and hardware drivers. The HAL allows robotic software that is developed for one robot to be efficiently ported to another robot. The HAL also allows reconfiguration of an existing robot to be performed without the need to modify the robotic software. For example, a sensor or an actuator can be changed. Use of the HAL promotes the rapid development and advancement of robot software and hardware.

Figure 1B:
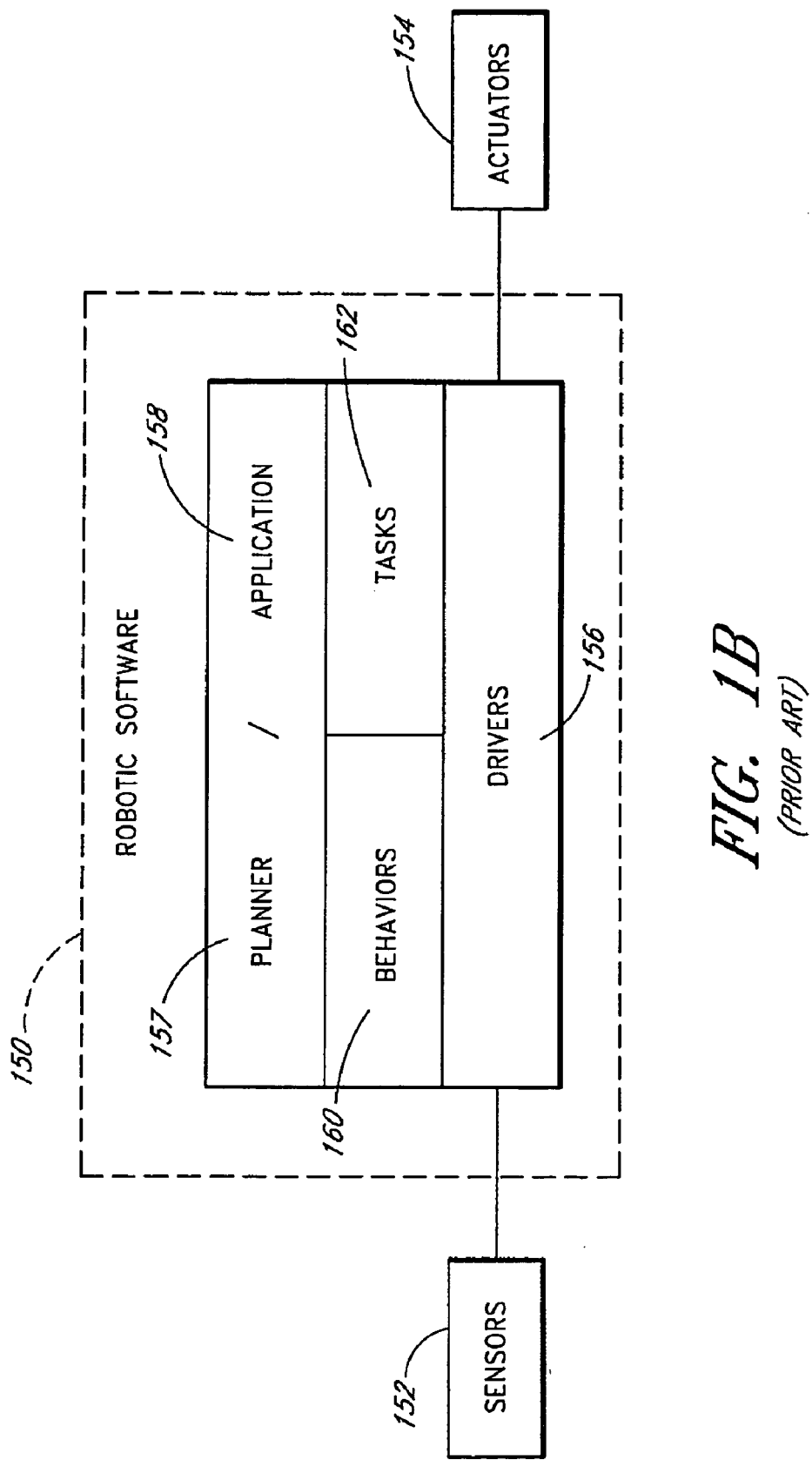
FIG. 1B illustrates a conventional robotic software architecture.

FIG. 1B illustrates a software architecture for a conventional robot. Robotic software 150 processes inputs from sensors 152 and provides control outputs to actuators 154. In the illustrated software architecture of FIG. 1B, the robotic software 150 includes a high-level planner 157 or an application 158. A high-level planner 157 uses goals that are specified in a symbolic form. The high-level planner 157 has intrinsic logic to determine how to best achieve those goals. For example, high-level planners are used in a variety of robotic applications, such as mission planning, search and rescue, and service-oriented tasks. The application 158 can correspond to a software program or algorithm for control of the robot. The high-level planner 157 or the application 158 achieves its goals by coordinating smaller software components illustrated as behaviors or tasks that encapsulate various robotics operations. An example of a behavior is "avoid any obstacle in front of the robot." An example of a task is "go to a particular location on an internal map." A high-level planner 157 given the goal of "go to the conference room" can coordinate the use of the "avoid" behavior and the "go to location" task to locate the conference room in an internal map and move there without running into obstacles. These behavior and task components can form an intermediate behavior layer 160 and/or a task layer 162. The behavior layer 160 and/or the task layer 162, then interacts with the robotic hardware, i.e., the sensors 152 and/or the actuators 154, through low-level device drivers 156.

The low-level device drivers 156 are specific to corresponding hardware devices. The low-level device drivers 156 typically support commands given and provide feedback information in terms of the corresponding device's physical characteristics. For example, a driver for a motor can be configured to support a command to spin the motor at a given speed, which can be specified in some number of revolutions per minute (RPM). When the motor is used in a drive system for a robot, the behavior layer 160 and/or the task layer 162 provide commands to the corresponding low-level device driver in terms of motor revolutions. This is relatively inefficient and inconvenient.

Robot motions can be more efficiently described in terms of dimensional units applicable to the robot, rather than to the motor. For example, a more convenient notation used by embodiments of the invention describe robot displacement using direct distance units such as centimeters or velocity units such as centimeters per second. This direct notation can be far more convenient to use than indirect notation such as a motor's rotational velocity.

By contrast, when conventional robotic software 150 is configured to interface with the low-level device drivers 156, the behavior layer 160 and/or the task layer 162 translates values in these indirect units to the characteristics of the particular robot's drive systems. For example, a software developer using conventional robotic software disadvantageously tailors the behavior layer 160 and/or the task layer 162 for the particular gear ratios and wheel sizes in the particular robot in order to achieve a specified displacement. These customizations disadvantageously need to be retailored when changes are made to the robot, such as a change in a wheel size. In addition, the behavior layer 160 and/or the task layer 162 as tailored for a particular robot are typically not portable to a robot of a different configuration.

Figure 2:
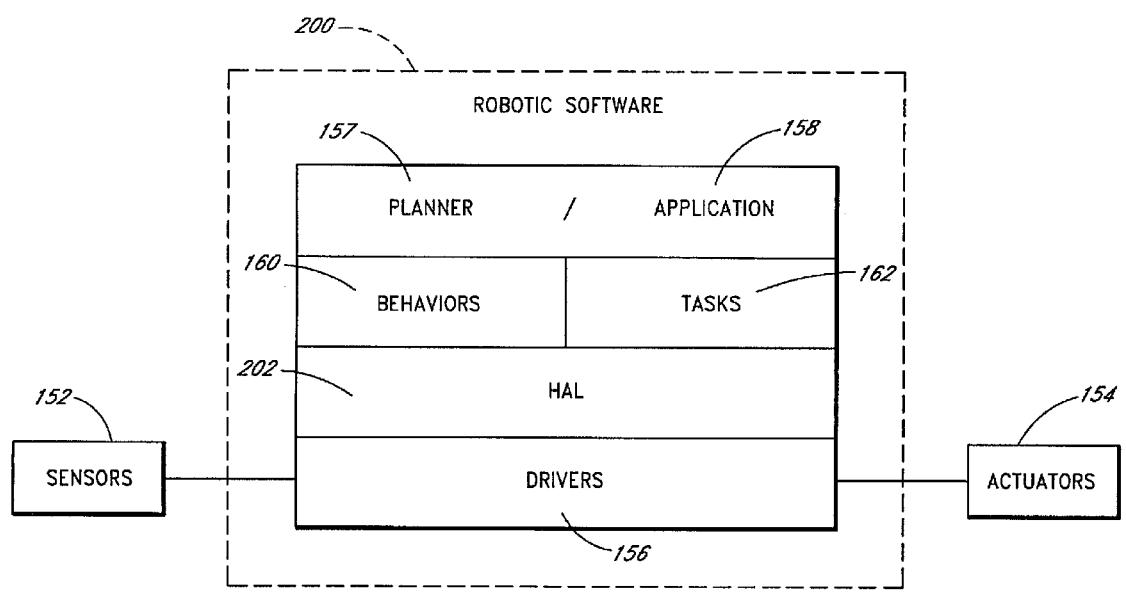
FIG. 2 illustrates a software architecture with a hardware abstraction layer (HAL).

FIG. 2 illustrates a software architecture 200 according to an embodiment of the invention with a hardware abstraction layer (HAL) 202. The HAL 202 advantageously provides an intermediate layer interface to higher-level robotic behavior software, thereby permitting the higher-level robotic behavior software to be developed based on real-world dimensions rather than with the particular details of the underlying hardware. This advantageously allows software developers to work with real-world concepts when programming robotic applications without the distractions of compensating for the minute details of underlying robotic hardware devices. In one embodiment, the HAL 202 also permits robotic behavior software written on top of the HAL 202 to operate without modification on different robotic hardware platforms.

The software architecture 200 can also be loaded on a variety of platforms. For example, the illustrated software architecture 200 can be implemented on a broad variety of operating systems, such as Linux, Unix, Microsoft® Windows®, Apple® MacOS®, and the like. A wide variety of computer hardware can also host the software architecture 200 for the robot. For example, the computer hardware can correspond to personal computers, to laptop computers, to personal digital assistants (PDAs), to single-board computers, and the like. It will be understood that the computer hardware can be local to the robot or can be remotely located.

As illustrated by FIG. 2, the HAL 202 resides in a software layer between a layer for the low-level device drivers 156 and behavioral robotic software. Further details of one embodiment of the HAL 202 are described later in connection with FIGS. 3, 4, 6, 7, and 8. In one embodiment, the layer for the low-level device drivers resides in an underlying operating system (OS), e.g., a layer in Windows® XP. In addition to providing a relatively uniform control interface for a robot, the HAL 202 provides a relatively uniform interface for interaction with sensors of a robot. However, for an autonomous robot, other information such as the position of the sensor on the robot, the sampling rate of the sensor data, and other sensor characteristics may also be needed in order to use the sensor data for autonomous decision and action. Embodiments of the HAL 202 can advantageously further include a set of techniques for encapsulating these characteristics of a sensor in a robot system and provide a relatively uniform interface for accessing data in a manner that is advantageously independent of the particular characteristics of the underlying robotic hardware.

One embodiment of the HAL 202 provides at least one of the following benefits:
 (I) provides a flexible framework for abstracting hardware devices;
 (II) provides platform neutrality; and
 (III) provides system-level efficiency for real-time control of robotics hardware.

Benefit (I), providing a flexible framework for abstracting hardware devices, is described in greater detail later in connection with FIG. 4. To achieve (II) platform neutrality and (III) system-level efficiency, one embodiment of the HAL 202 can be implemented with the C++ programming language. The C++ programming language provides relatively widely standardized support on a variety of platforms with system-level efficiency. In addition, the C++ programming language's support of object oriented methodology also promotes a relatively well organized software design. It will be understood by one of ordinary skill in the art that a wide variety of programming languages can be used. In another embodiment, Java or Lisp is used.

Figure 3:
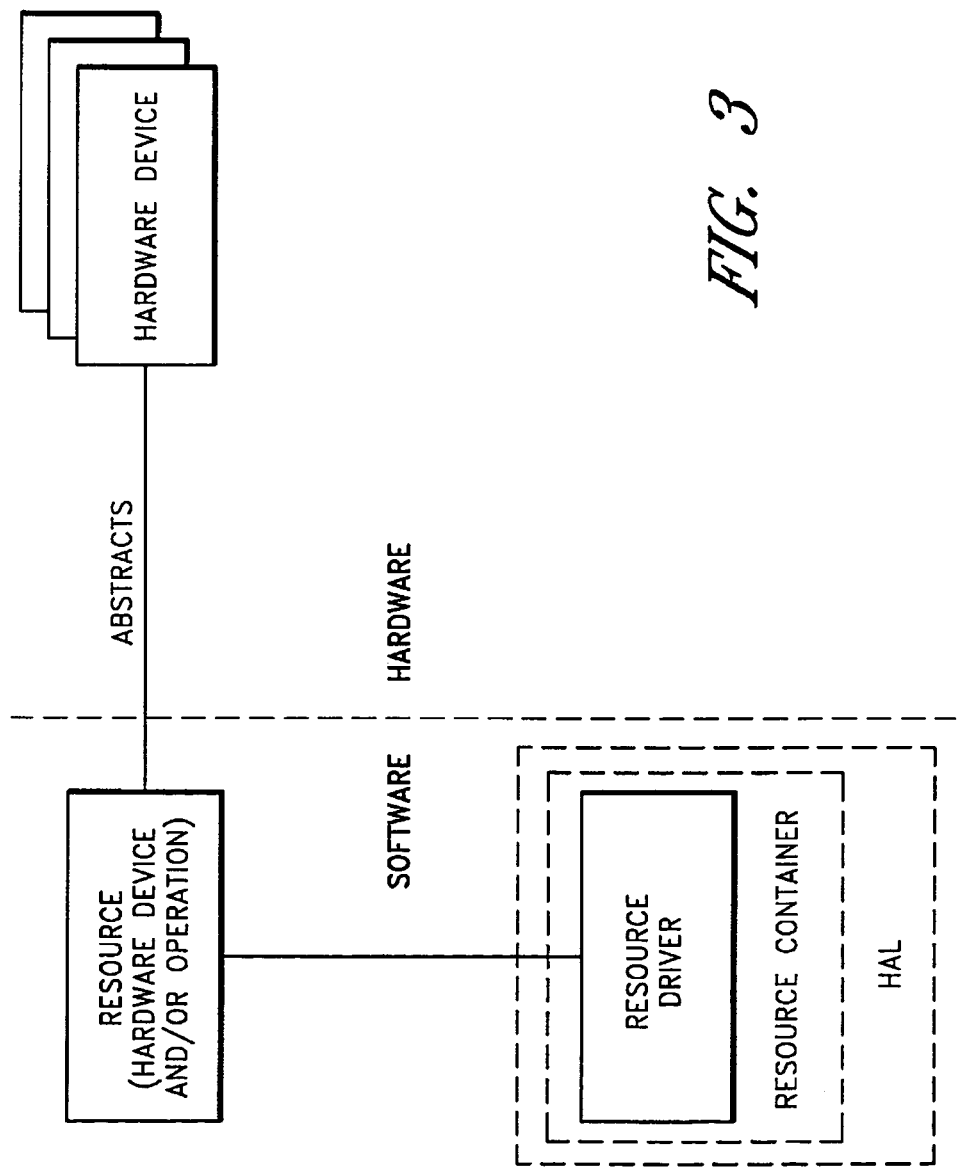
FIG. 3 illustrates abstraction of a hardware device and the relationship between a resource driver and a resource.

FIG. 3 illustrates the abstraction of a hardware device in the HAL 202 and illustrates the relationship between a resource driver 302 and a resource 304. The HAL 202 provides a communication path to the low-level hardware devices 306 through their resources 304 and low-level device drivers 156. A resource 304 can correspond to a logical construct that encapsulates or represents a discrete set of robotic operations and/or sensory feedback to provide control over the hardware device 306. A low-level device driver 156 can correspond to relatively low-level software that controls the hardware device 306 associated with a given resource 304. The HAL 202 accesses the hardware device 306 via the resource driver 302 corresponding to the appropriate resource 304.

The hardware device 306 that is abstracted by the resource 304 can include both active components, such as motors, that receive commands or provide sensor data and can include passive components, such as gears and wheels, which, while not in communication with the resource 304, affect the interaction of the robot with the physical world. Hardware abstraction can vary from relatively simple to relatively complex. A relatively simple example of hardware abstraction is a single motor assembly. For example, the abstraction of a motor's drive system can include storage and usage of wheel diameters and gear ratios to calculate motion resulting from motor revolutions. In an example of medium complexity, the hardware device 306 such as an IR sensor is abstracted by reading from the hardware device 306 and converting the reading, which can be in, for example, volts, into appropriate dimensional units, such as centimeters. An aggregate of components, such as a differential drive system, is a relatively complicated example of the hardware device 306. One example of an abstraction of a differential drive system uses the proper coordination of the velocity and acceleration of two motors to achieve the desired linear and angular velocities.

The resource 304 can represent a physical device, a physical connection point, a software resource, such as speech recognition software, and other ways with which the robotic control software interacts with the external environment. Resources 304 can represent sensors and actuators, network interfaces, microphones and speech recognition systems, and even an amount of battery charge remaining. While a resource 304 can represent or model a physical device, combination of physical devices, software operation, or hardware operation, a resource driver 302 can correspond to a software implementation of the resource 304, as show in FIG. 3. For a resource 304 that represents an external software application, such as software to render a 3D face or software for speech recognition, the resource driver 302 can correspond to an intermediate abstraction layer that presents a standard application program interface (API) to the external software resource.

In another example, a resource 304 for a drive system allows the motion of a corresponding robot to be specified terms of velocity and acceleration with physical distance units, such as centimeters per second. This advantageously permits robotic behavior software to be developed without regard as to whether the robot uses a differential drive system with two motors or uses mechanical legs to move.

A resource 304 for the hardware device 306 can be an abstraction of a portion of a hardware device, an entire hardware device, or combinations of hardware devices. For example, in the motor drive system, the resource 304 can abstract a wheel, a gear, and a motor. In addition, a single hardware device 306 or portion thereof can be extracted by one or more resources 304. For example, the same wheel and gear that is used in an abstraction for a motor drive system can be included in an abstraction for position feedback in odometry.

Figure 4:
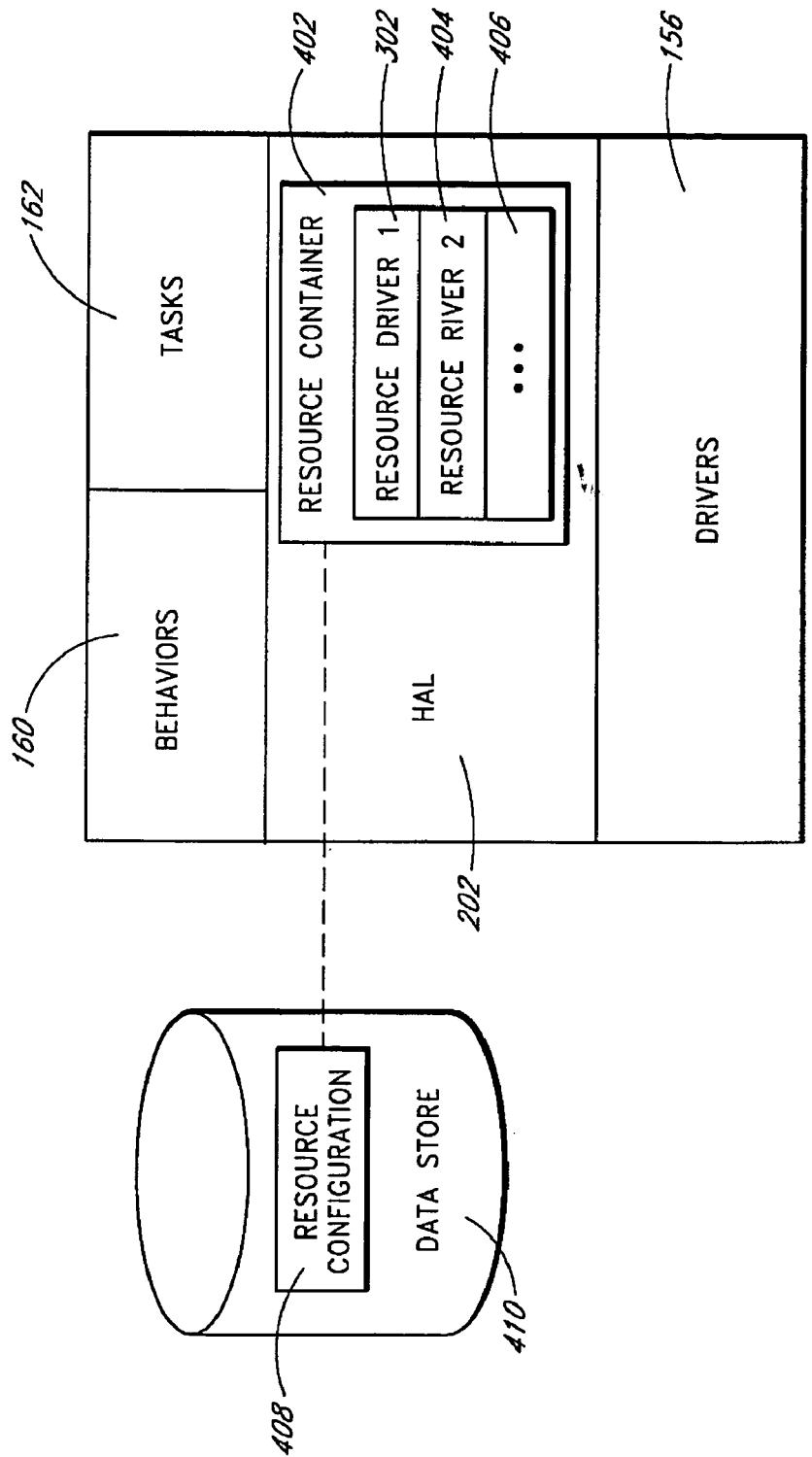
FIG. 4 illustrates further details of a HAL.

FIG. 4 illustrates further details of the HAL 202. The HAL 202 includes a resource container 402, which in turn includes one or more resource drivers 302, 404, 406. It will be understood that the number of resource drivers in the resource container 402 can vary in a very broad range. A resource configuration 408 can include information that is used to create the resource drivers 302, 404, 406. The resource configuration 408 can be stored in a persistent data store 410. One embodiment of the resource configuration 408 is described in further detail later in connection with FIG. 6.

Benefit (I) of the HAL 202, i.e., providing a flexible framework for abstracting hardware devices, was briefly described earlier in connection with FIG. 2. In one embodiment, benefit (I) of the HAL 202 can advantageously be implemented by implementing at least a portion of the following advantages:

I(a) provide a resource configuration 408, which describes available resources to the HAL 202 with a relatively generic and portable device description format such as XML;

I(b) manage the life cycle of devices 306 abstracted by resources 304;

I(c) provide an expandable set of software interfaces for various robotic operations based on real-world concepts and units;

I(d) provide access to resources 304 to higher-level software; and

I(e) provide a secure mechanism for accessing devices 306.

Figure 5:
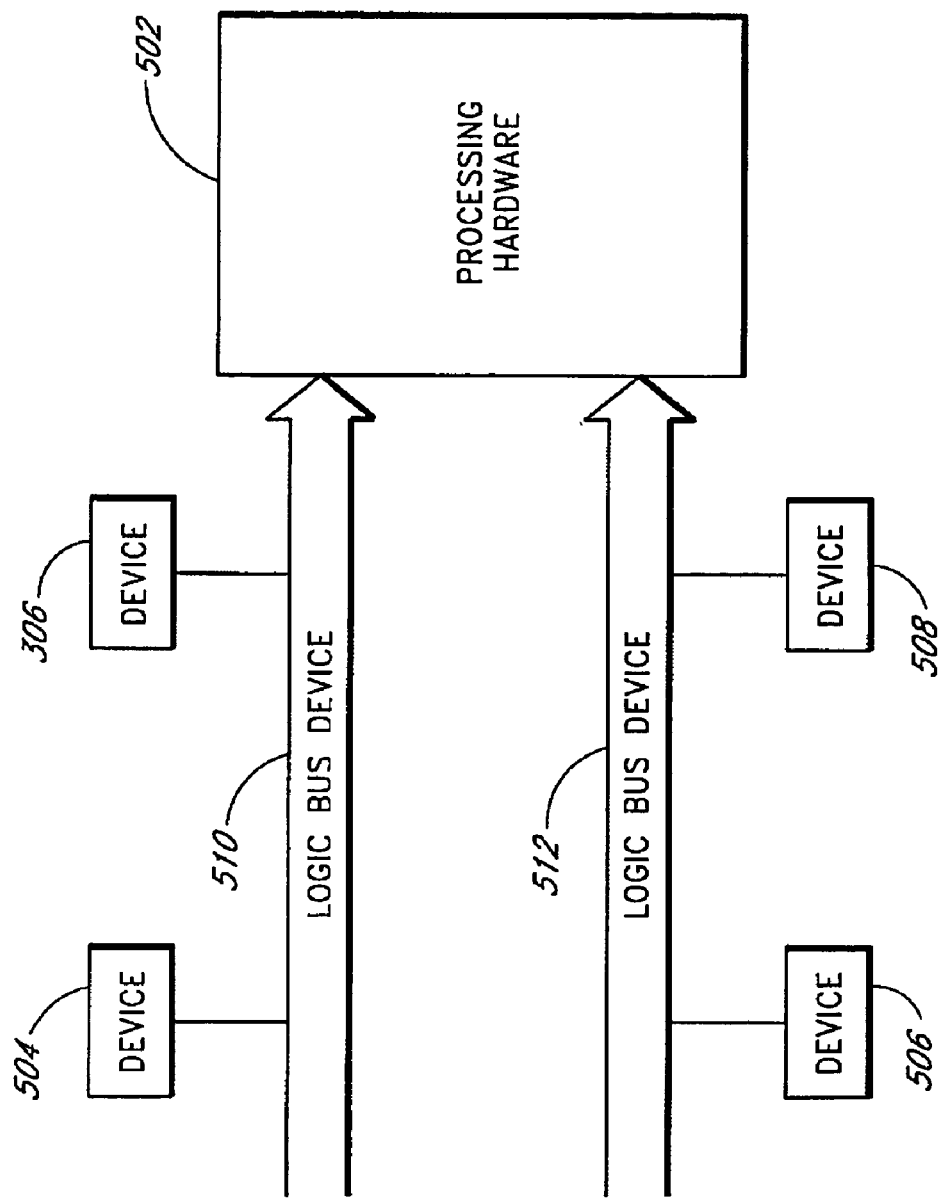
FIG. 5 illustrates coupling of hardware devices to processing units through logical device buses.

FIG. 5 illustrates coupling of hardware devices to processing units through logical device buses. The resources 304 that are available on a particular robotics platform should be described to the HAL 202 so that the HAL 202 can properly abstract those resources 304 and make the abstracted resources 304 available for use by higher-level software. In one embodiment, resources 304 are described to the HAL 202 in a tree-like hierarchical data structure referred to as the resource configuration 408. The organization of the resource configuration 408 can mimic the real-world coupling of robotic hardware devices to processing hardware 502.

The various hardware devices can be coupled to the robot's processing components 502 via logical device buses. A logical device bus can include the hardware data bus, which can correspond to a wide variety of hardware data buses, such as, for example, serial ports, parallel ports, PCI bus, USB, Firewire, etc. A logical device bus can further correspond to a logical construct that includes a special protocol or driver used with the robotic device to communicate over a hardware data bus.

For example, robotic device A 306 and hardware device B 504 couple to a first USB port and use a human interface driver, while a hardware device C 506 also connects to a USB port but uses a virtual COM port driver. Hardware device A 306 and hardware device B 504 couple to a first logical data bus 510 that is an aggregate of the USB hardware port and the human interface driver. By contrast, the hardware device C 506 couples to a second logical data bus 512 that is an aggregate of the USB hardware port and the virtual COM port driver. FIG. 5 further illustrates a hardware device D 508 also coupled to the second logical data bus 512. It will be understood that the number of logical data buses can vary in a very broad range.

It will be understood that one or more hardware devices 306, 504, 506, 508 can attach to a single logical device bus, but a single device should not be attached to more than one logical device bus. Multiple hardware devices 306, 504, 506, 508 can be aggregated into device groups.

Figure 6:
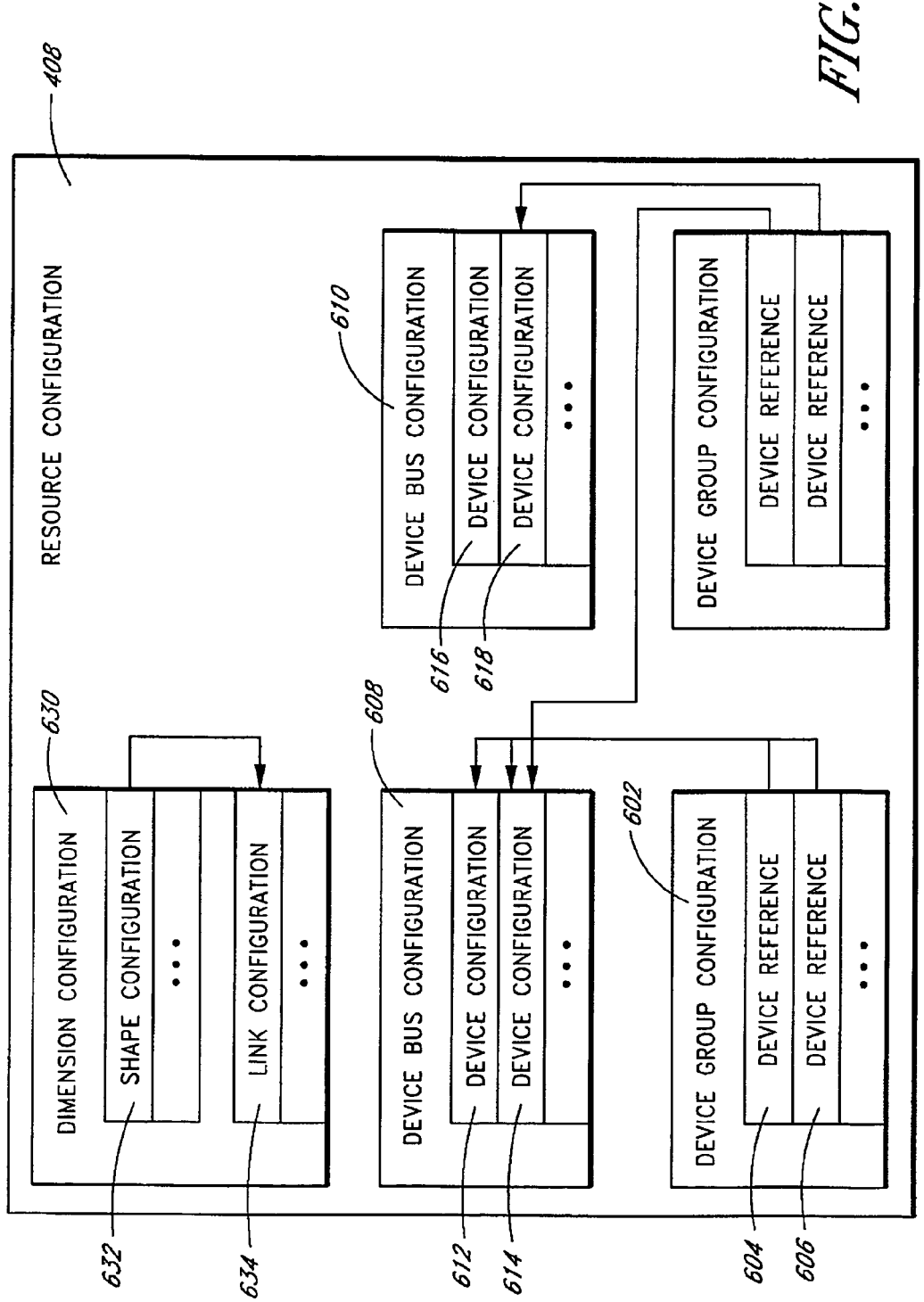
FIG. 6 illustrates further details of a resource configuration.

FIG. 6 illustrates further details of one embodiment of a resource configuration 408. The resource configuration 408 can include one or more device group configurations and one or more device bus configurations. A device group configuration can include one or more references to hardware devices. For example, a first device group configuration 602 in FIG. 6 is shown with a first device reference 604 and a second device reference 606.

The first device group configuration 602 uses an implementation of a corresponding resource driver, such as the resource driver 302 described earlier in connection with FIG. 3, that manages how the hardware devices corresponding to the first device group configuration 602 interact with each other. A resource driver for a motor drive system is an example of a resource driver that implements a device group configuration, such that the resource driver for the motor drive system can aggregate one or more motors, gears, and wheels. In one embodiment, the physical properties of how and where a device is mounted on a robot is part of the device description itself, i.e., the structures and the devices are described in the resource configuration of the HAL 202, and the physical properties of how and where a particular device is mounted is not aggregated with devices in a device group configuration. One example of the device configuration for an IRSensor in XML format is provided below:

```
<Device id="IR_tne" type="Evolution.USBIrSensor">
<Parameter name="address" value="0"/>
<Parameter name="link" value="origin"/>
<Parameter name="x" value="-20"/>
<Parameter name="y" value="-10"/>
<Parameter name="z" value="22"/>
<Parameter name="roll" value="0"/>
<Parameter name="pitch" value="0"/>
<Parameter name="yaw" value="-pi/4"/>
</Device>
```

In the example shown above, the id attribute uniquely identifies the IR device. The type attribute indicates that the device is a USB IR sensor. The address value indicates the address on the logical device bus where this device can be found. The link value indicates how this device is attached to the robot. The x, y, and z variables correspond to the device's position on the robot. The roll, pitch, and yaw variables correspond to the device's orientation on the robot.

Available logical device buses as described in connection with FIG. 5 should also be described in the resource configuration 408. A description for a logical device bus corresponds to a device bus configuration as illustrated in FIG. 6. For example, a first device bus configuration 608 can correspond to the first logical data bus 510, and a second device bus configuration 610 can correspond to the second logical data bus 512.

The device bus configuration should include any information used to activate and make use of the logical device buses in software. For example, if a logical device bus is an abstraction of a serial protocol, the corresponding device bus configuration should include any relevant serial communication parameters, such as baud rate, parity, etc.

Hardware devices can be specified and defined by a corresponding device configuration. For example, a hardware device A 306, a hardware device B 504, a hardware device C 506, and a hardware device D 508 as illustrated in FIG. 5 can be specified and defined by a first device configuration 612, a second device configuration 614, a third device configuration 616, and a fourth device configuration 618, respectively. The device configurations 612, 614, 616, 618 can include information pertaining to the physical characteristics of the device, such as length, width, mass, etc., can include the device's location, and can include the orientation on the robot, as appropriate.

In an example where the first hardware device 306 corresponds to a camera, the camera's location and orientation on the robot can be useful and should be included in the corresponding device configuration 612. However, such location and orientation information may not be relevant to another robotic device, such as a text-to-speech device.

One or more device configurations are grouped under the logical device bus configuration of the logical device bus over which the corresponding robotic device is coupled. A device configuration such as the first device bus configuration 608 preferably includes the information used to activate and make use of one or more corresponding hardware devices 306, 504 in software, including device parameters. For example, where the hardware device B 504 corresponds to an infra-red (IR) sensor, information such as the infra-red sensor's address on the first logical data bus 510, calibration data for the sensor, the sensor's minimum and maximum range, etc., should be specified. In another example, where a resource 304 abstracts only for one robotic device, such as only for the hardware device C 506, the corresponding device configuration 616 should fully specify the data used for the resource 304 to properly abstract the hardware device C 506, including conversion factors used to translate device data from device units to more convenient units, such as real-world units.

Each device bus configuration, such as the first device bus configuration 608, each device configuration, such as the first device configuration 612, and each device group configuration, such as the first device group configuration 602 can be identified by unique identifier (id) string. One embodiment of the HAL 202 uses this unique id to efficiently distinguish between different resources.

Figure 7:
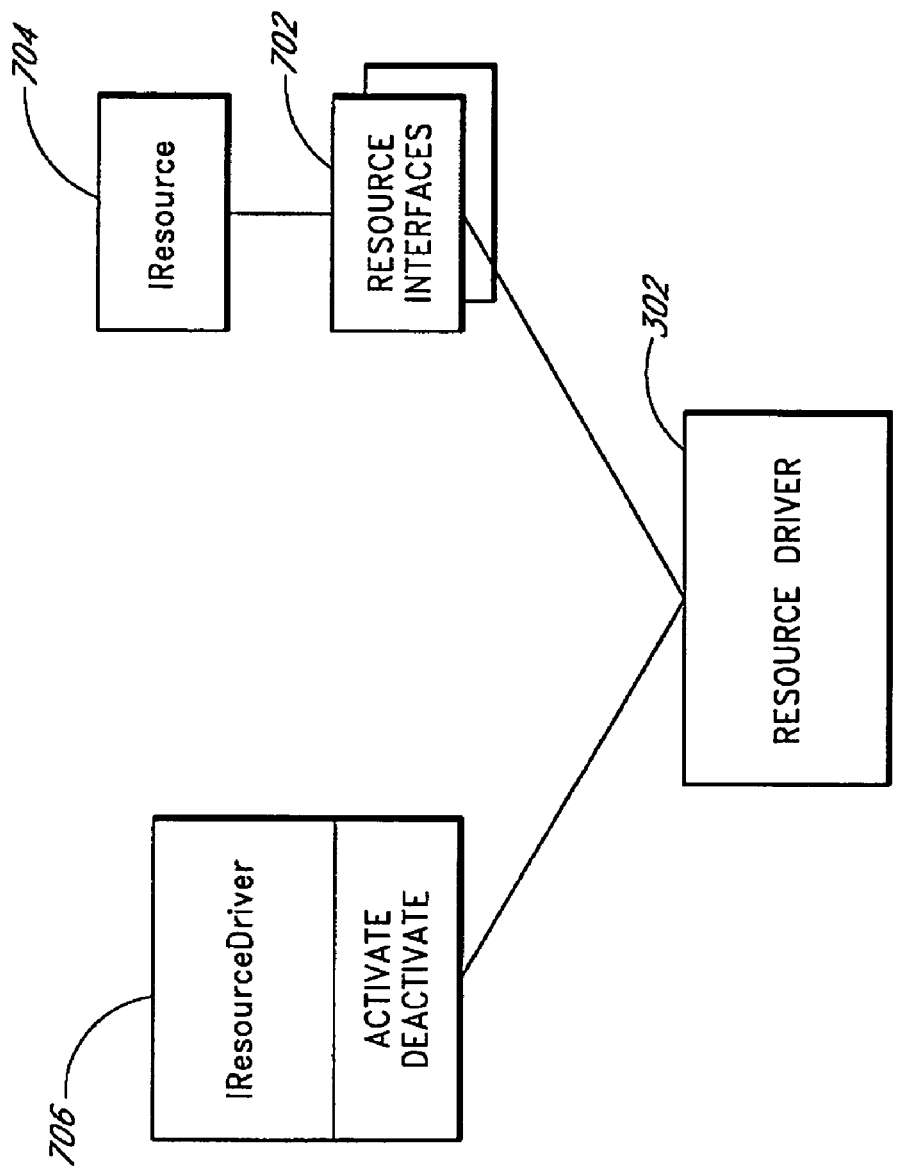
FIG. 7 illustrates how a resource driver object derives from an IResourceDriver and one or more IResource interfaces.

FIG. 7 illustrates how a resource driver object derives from an IResourceDriver and one or more IResource interfaces. To obtain a resource interface 702 for a selected resource 304, one embodiment of the HAL 202 calls a method, such as an "obtain_interface" method from the resource container 402 by using the id of the selected resource 304.

Returning now to FIG. 6, in one example, where there are two IR sensors mounted on a robot, the first device configuration 612 for a first IR sensor can have an id of "IR1," and the second device configuration 614 for a second IR sensor can have an id of "IR2." Both of these sensors are range sensors, so for robotic software to use these sensors, the HAL 202 retrieves the IRangeSensor from the resource container 402 so that the appropriate id, i.e., "IR1" for the first sensor and "IR2" for the second sensor, is passed in as the second parameter (resource_id) of the "obtain_interface" method of the resource container 402.

When a resource 304 abstracts multiple devices, it can be described as a device group configuration as described earlier in connection with FIG. 6. A device group configuration, such as the first device group configuration 602, can include references to the device references of the hardware devices in the device group configuration. For example, the first device group configuration includes the first device reference 604 and the second device reference 606.

In one embodiment, a device reference, such as the first device reference 604, includes only sufficient data to uniquely identify the device configuration, such as the second device configuration 614 to which the first device reference 604 refers. The unique identifiers can correspond to identifiers in a relational database or in an Extensible Markup Language (XML) implementation of the resource configuration 408, the first device reference 604 can correspond to an XML tag that includes the id of the second device configuration 614 to which it refers. Device references of a device group configuration, such as the first device reference 604 and the second device reference 606 of the first device group configuration 602 can point to one or more device configurations of varying device bus configurations.

In one embodiment, multiple hardware devices such as the hardware device B 504 and hardware device D 508, can be abstracted by a resource even when attached to different logical device buses 510, 512. The ability to abstract a group of hardware devices, which can include hardware devices that communicate with distinct logical device buses, advantageously expands the number of device group configurations that are possible and can be supported by the HAL 202. In one embodiment, an aggregation of devices in a device group corresponds to a distinct resource driver 302 for the group.

The resource configuration 408 can also store structural information for the robot. In one embodiment, the structural information is maintained in a dimension configuration 630, containing one or more shape configurations 632. Each shape configuration 632 can contain the information about a rigid structural element of the robot. In one example, this information can be configured to maintain information, such as at least one of the following:

the position of the rigid structural element relative to the ground center of the robot in terms of x,y,z coordinates, using the right hand coordinate system with the positive z-axis pointing up and the positive x axis pointing forward;

the size of the structural element, in terms of the dimensions along the x, y, and z axes;

the orientation of the structural element, in terms of roll, pitch, and yaw; and the id of the link associated with the rigid structural element.

In addition to shape configurations 632, the resource configuration 408 contains link configurations 634 which describes the joints connected to the link. Each link configuration 634 can represent one rigid structural element and has a unique id. In one embodiment, the link configuration 634 includes information about the joints connecting the rigid structural element to other rigid structural elements using Denavit-Hartenberg parameters.

The storage format of the resource configuration 408 can vary in a very broad range. One embodiment is advantageously implemented using XML files, but it will be understood by one of ordinary skill in the art that the format of the resource configuration 408 can be virtually anything, provided that the proper device information is stored in a retrievable format. The resource configuration 408 also should be stored in an accessible persistent data store 410, such as in flash memory or in a hard drive, for retrieval as desired by the HAL 202.

The resource configuration 408 can be retrieved by a resource configuration parser. In one embodiment, the resource configuration parser can correspond to a software module that is responsible for parsing the device configurations stored in the resource configuration 408 into a format that is internally usable by the HAL 202. The parsed resource configuration information is provided to the resource container 402, where it is stored and used by the HAL 202. In one embodiment, standard XML parsing technology can be used by the resource configuration parser for parsing an XML-based implementation of the resource configuration 408. The resource configuration 408 can provide advantage I(a): provide a resource configuration 408, which describes available resources to the HAL 202 with a relatively generic and portable device description format.

The resource container 402 obtains information about available resources 408 on the applicable robotic platform through the resource configuration parser. In one embodiment, for each resource 304, there is a resource driver 302, which can abstract one or more devices, as described by a device configuration, such as the first device configuration 612, or by a device group configuration, such as the first device group configuration 602.

The resource container 402 can create a corresponding resource driver 302 for each device configuration or device group configuration in the resource configuration 408. In one embodiment, a reference to the created resource driver 302 is stored in a driver table. The resource container 402 can also calculate a dependency list for each resource driver 302. The dependency list can include a list of other resource drivers 302, as applicable, that should precede the resource driver 302 in activation order. The activation order can be important for when compound resource drivers exist that abstract more than one hardware device, such as the hardware device A 306 or the hardware device B 504.

In one embodiment, the resource driver 302 for each individual hardware device 306, 504, 506, 508 should be activated before the compound resource driver 302 is activated. The resource container 402 can use the dependency lists of one or more resource drivers to determine the order in which resource drivers 302 should be activated. Once a satisfactory activation order has been determined, the resource container 402 can activate the applicable resource drivers in the activation order. To support the activation and deactivation of resources, the HAL 202 can include an IResourceDriver interface 706.

As illustrated in FIG. 7, the IResourceDriver interface 706 includes "activate" and "deactivate" virtual methods. The implementations of resource drivers 302 should derive from the IResourceDriver interface 706 and implement the "activate" and "deactivate" virtual methods. The "activate" method should perform tasks used to make the resource driver 302 ready for use in software. The "deactivate" method cleans up data used by the resource driver 302 and properly shuts down the corresponding hardware devices abstracted by the resource driver 302.

When the activation sequence of the resources has been determined, the resource container 402 calls the "activate" method of each resource driver 302 according to the activation sequence. In one embodiment, the deactivation sequence is the opposite of the activation sequence. For example, when the software terminates, the resource container 402 deactivates the resource drivers 302 by calling their "deactivate" methods in reverse order of the activation order. The "activate" and "deactivate" methods of the resource drivers 302 and their use by the resource container 402 accomplish advantage I(b).

Advantage I(c) of the HAL 202 is to provide an expandable set of software interfaces for various robotic operations based on real-world concepts and units. This expandable set of resource interfaces is described herein as resource interfaces 702 and can be implemented by the resource drivers 302 of the HAL 202. A resource driver 302 abstracts and encapsulates robotic operations by implementing one or more resource interfaces 702. A resource interface 702 can derive from the base IResource 704 interface definition and can encapsulate a type of robotics operation or device. Typically, a resource driver 302 object derives from both the IResourceDriver base class 706 and the base class of the resource interfaces 702 that it implements, as illustrated in FIG. 7

A resource interface 702 can correspond to a list of function calls (methods) that perform a set of robotic operations. Higher-level software interacts with the resource drivers 302 and eventually interacts with the underlying hardware devices by receiving references to the resource driver's resource interface(s) and calling the resource interface's methods. These methods and their parameters and results can be conveniently defined in real-world terms, with no assumption about the underlying hardware or implementation. For example, an IDriveSystem resource interface, which is described in greater detail later in connection with Code Block 9, can include methods such as "move_and_turn," which can be configured to allow the control of a robot's motion by specification of the desired linear and angular velocities and the corresponding accelerations, using standard units such as centimeters per second (cm/sec) for velocities, and $cm/sec^2$ for accelerations. Another example is an IRangeSensor resource, which can be configured to provide a "get_distance_reading" method, which returns the reading from a range sensor in convenient units of distance, such as centimeters. A sample list of resource interfaces and corresponding methods is described later after the discussion of sample Code Blocks.

To support the expandability of resource interfaces 702, the HAL 202 can specify that the code that implements the resource interfaces 702 resides in a dynamically loadable shared library. This construct, which can be known as a dynamic link library in Windows® and as a shared library or as a shared object on other platforms, is supported by most modern operating systems, and will be referred to hereinafter as a "shared library." The name and location of the shared library containing the resource driver implementation should be specified as part of the resource configuration 408. Thus, different implementations for different hardware performing the tasks abstracted by the same resource driver 302 can be implemented in different shared libraries, and the correct library is loaded for the hardware that is being used. This permits new implementations to be easily added to the framework. In addition, new resource drivers can even be defined by third parties, and their implementations can be stored in new shared libraries that are loaded into the robotic system at run-time.

After identifying the shared library that includes the resource driver 302, the HAL 202 is able to instantiate the resource driver 302. However, it can be preferred to verify that the shared library is loaded when the resource driver 302 is instantiated. In one embodiment, the shared library is directly linked into the executable to run, but that can be inconvenient and impractical. Preferably, the resource driver id and its shared library should be advertised in some manner to enable dynamic loading. In one embodiment, the HAL 202 provides a C++ macro DECLARE_RESOURCE, which is placed in the resource driver 302 code to advertise its id and shared library name. The DECLARE_RESOURCE macro can include the declarations of one or more methods and a data item used by the HAL 202 to create a resource driver. The DECLARE_RESOURCE macro can advantageously save the resource driver's implementors from having to type in these standard methods and data member. For example, these methods can include a "create_resource" method, which the HAL 202 can call to create an instance of the resource driver, and a "get_driver_id" method, which the HAL 202 can call to retrieve the id of the resource driver. The data member declared in the DECLARE_RESOURCE macro contains the resource driver's id.

In one embodiment, the HAL 202 searches for a resource directory under the paths in an environment variable set in the operating system. The resource configuration 408 of the resource driver 302 can specify the name of the shared library that contains the resource driver 302. When the resource driver's id has not been registered, the HAL 202 can attempt to load the shared library containing the resource driver 302, by using an operating system method for loading shared libraries.

In a C++ implementation, the resource driver 302 derives from the IResourceDriver interface 706 and the IResource-derived resource interfaces 702 that it implements, using multiple inheritance. The resource driver 302 then implements the virtual methods of these interfaces using the appropriate code for the particular details of the resources 304 that are abstracted.

A variety of resource drivers 302 and the resource interfaces 702 can reside on a given system. The following describes one way to identify which resource interfaces 702 are actually available.

The IResourceDriver interface 706 base class specifies a virtual "obtain_interface" method that should be implemented by the resource drivers 302. This method is how the resource driver 302 identify which resource interface 702 the resource driver 302 implements.

This method takes as input an interface resource id. When the resource driver 302 implements the resource interface 702 with the specified id, the "obtain_interface" method returns a valid reference to the named resource interface 702, which can then be used to directly call methods of that resource interface 702.

Advantage I(d) is to make the resources available to higher-level software. Once the resource drivers 302 have been activated, the resource container 402 makes the resources available for use by higher-level software. In one embodiment, the resource container 402 makes the resources available through its own "obtain_interface" method. This method takes a resource driver id and a resource interface id. The resource container 402 locates the specified resource driver, and then calls that driver's "obtain_interface" call to determine if the specified resource interface 702 is implemented. If the specified resource interface 702 is implemented by the specified resource driver 302, the "obtain_interface" method of the resource container 402 returns a valid reference to that resource interface. If the specified resource interface 702 is not available in the specified resource driver 302, the "obtain_interface" calls returns an appropriate error code. This permits higher-level software to query the resource container 402 for desired resource interfaces 702. Once the higher-level software receives a desired resource interface 702, the higher-level software can call methods of that interface to interact with the resource 304. For example, once the higher-level software obtains a desired IRangeSensor resource interface to the range sensor, the higher-level software can call the get_distance_reading method of the IRangeSensor interface to obtain readings from the sensor in convenient real-world distance units.

Figure 8:
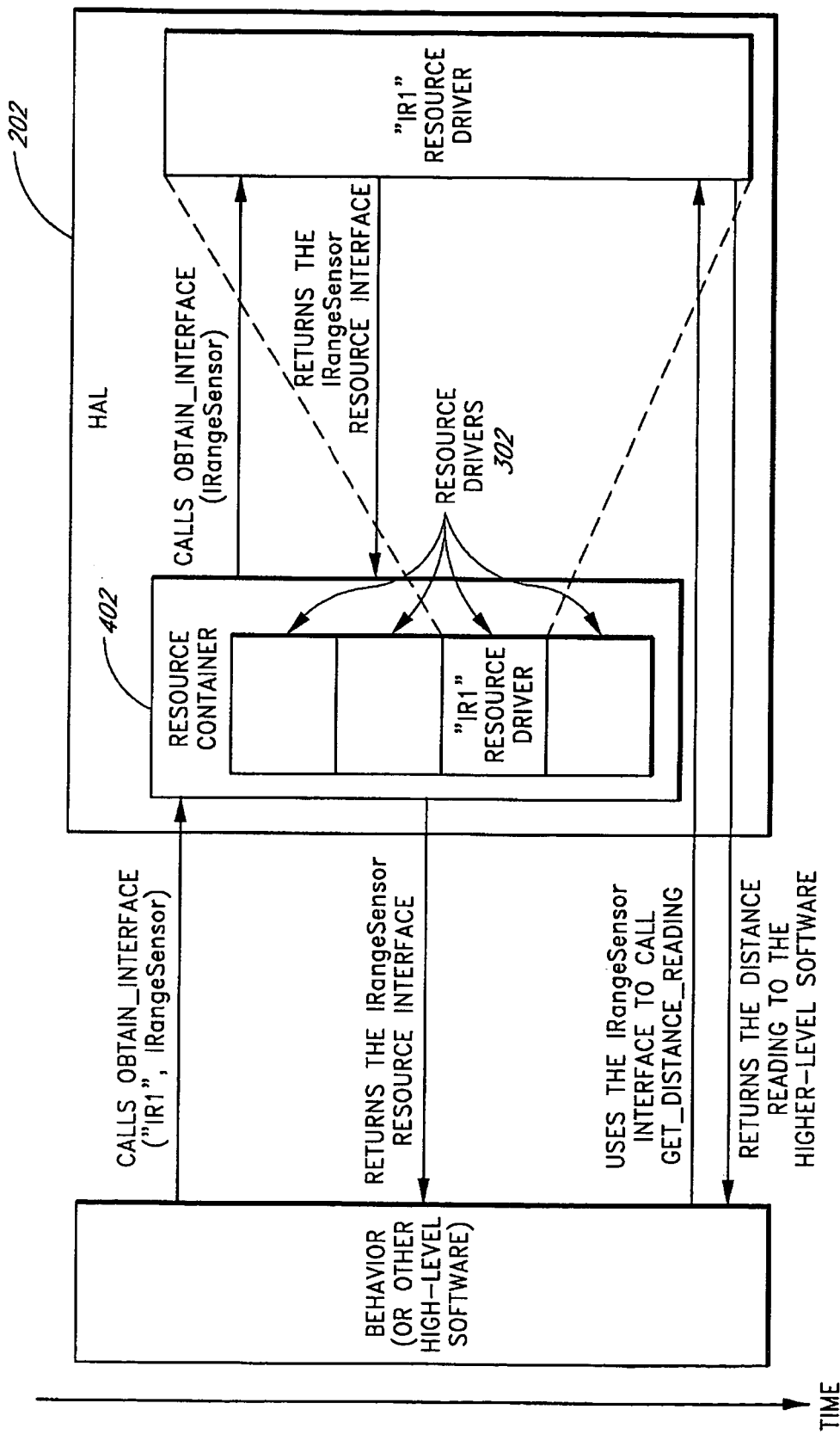
FIG. 8 illustrates the process of making resources available to higher-level software.

FIG. 8 illustrates the process of making resources available to higher-level software using the range sensor example. The process of making resources available was briefly described earlier in connection with advantage I(d). In FIG. 8, a behavior (higher-level software) desires the readings from a range sensor "IR1." The higher-level software calls the obtain_interface method of the resource container 402 to retrieve the IRangeSensor interface of the sensor "IR1." To fulfill this request, the resource container 402 searches through its resource driver table to locate the resource driver 302 corresponding to the resource "IR1." Once found, the resource container 402 calls the obtain_interface method of this resource driver 302 requesting for its IRangeSensor resource interface. The resource driver 302 corresponding to "IR1" implements the IRangeSensor resource interface, so it returns a reference to the IRangeSensor resource interface for the sensor "IR1" to the resource container 402, which in turn returns to the requesting behavior. The behavior now has a reference to the IRangeSensor resource interface to the range sensor "IR1," and can now call the get_distance_reading method of this resource interface to get the readings of the "IR1" range sensor in convenient real-world distance units. One example of how a range sensor resource driver 302 can return a reference to the range sensor interface and provide the proper distance reading is described later in connection with "Resource Driver Details."

In one embodiment, higher-level software at the behavior or task layer only interfaces with the resource container 402 and resource interfaces 702. Even though the higher-level software might be moved to a different robotic hardware platform, the HAL 202 takes care of this by loading up the correct resource drivers 302 based on the new robotic hardware platform's resource configuration 408. The status of a resource interface 702 that is no longer available on the new robotic hardware platform can be ascertained by the higher-level software by an error result code returned by the resource container's "obtain_interface" call, and the operations that depend on those resources can fail gracefully.

Advantage I(e) indicates that the HAL 202 should provide a secure mechanism for accessing hardware devices, such as the first hardware device 306. One mechanism that can be provided by the HAL 202 for security is to include a security parameter with every method call. The parameter, referred to herein as a ticket id, represents a security ticket and is preferably the first parameter in public methods of resource interfaces 702.

This mechanism supports a relatively fine security granularity down to an individual method level. For example, for a particular security clearance, some methods of a resource interface 702 may be available for use while others are restricted. In addition, the "obtain_interface" method of the resource driver 302 has a reservation count parameter. This parameter dictates how many concurrent accesses to the resource driver 302 are allowed. For example, this reservation count can be used to indicate to the resource container 402 how many clients may hold a reference to a resource driver 302 interface simultaneously. The resource container 402 uses this reservation count to track references and to deny an interface to a client when the reservation count is full. If an arbitrary number of simultaneous accesses is allowed, the reference count can be set to zero.

One example where a reservation count can be useful is when a resource driver 302 supports only one access at a time to a "writer" resource interface 702 that modifies the resource driver's 302 internal states, but supports unlimited access to "reader" resource interfaces 702 that merely query the resource driver's 302 internal state. The reader resource interfaces can specify a reservation count of 0, thereby allowing unlimited accesses, while the writer resource interfaces can specify a reservation count of 1 such that only a single write access at a time is enabled. The ticket id and reservation count parameter of the resource driver's 302 "obtain_interface" method can provide advantage I(e).

Resource Driver Details

The following describes further details of how a resource driver 302 can be created, including an example of an implementation of the resource driver for an IR sensor.

Resource drivers can be implemented by deriving from the abstract class IResourceDriver, in addition to the appropriate interface class(es). The IResourceDriver declares the basic methods through which other components of the HAL 202 interact with a driver. However, the HAL 202 can provide a helper class derived from IResourceDriver, called ResourceDriverImpl, which eases driver creation by providing a usable default implementation of methods such as "add_ref" and "remove_ref." A driver then can redefine methods for initialization, activation, and the methods of the resource interface(s) 702 that the driver implements.

Initialization

Figure 9:
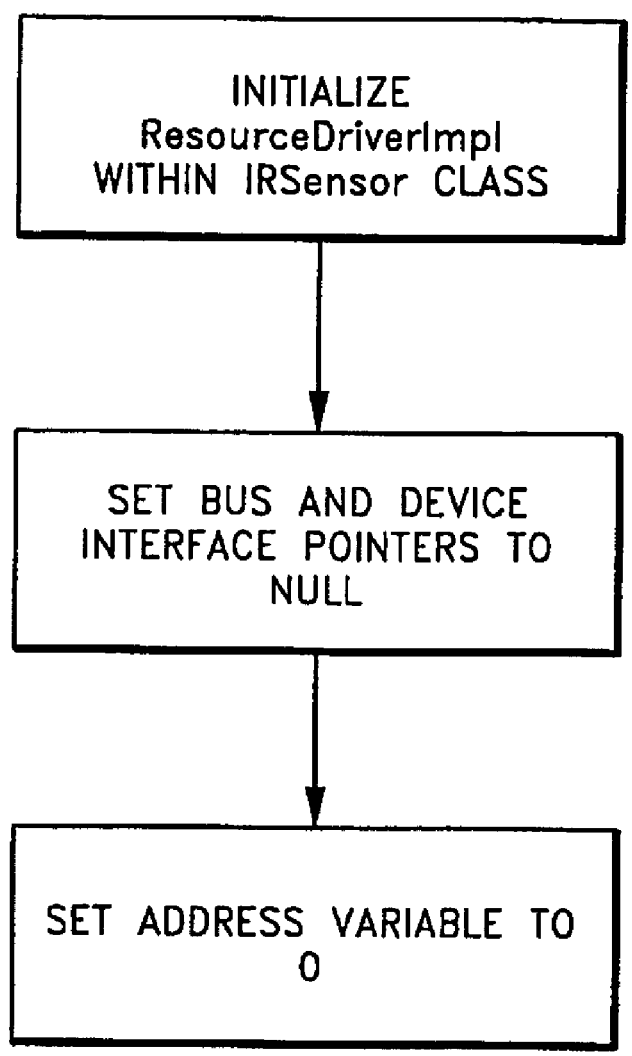
FIGS. 9–17 are flowcharts that generally illustrate aspects of the invention.

Initialization in the resource driver's constructor generally should be relatively simple, because hardware access and parsing configuration information typically occurs in the activation phase. The method initializes the object's member variables to prepare it for activation. The following is sample code corresponding to a relatively simple implementation of the IRSensor constructor:

Code Block 1 (FIG. 9):

```
IRSensor::IRSensor (TicketId ticket,
            const ResourceConfig& resource_config,
            IResourceContainer& resource_container)
    : ResourceDriverImpl (ticket, resource_config, resource_container)
{
    _bus = NULL;
    _device = NULL;
    _address = 0;
} // end IRSensor( )
```

In the illustrated embodiment, the constructor merely initializes data members to the default 0 values.

Activation

In one embodiment, three methods handle the resource driver's activation: "activate," "deactivate," and "is_active." As the names imply, the methods are respectively responsible for the activation, deactivation, and indication of activation state. Activation and deactivation can repeatedly occur, e.g., a failsafe system can deactivate and reactivate a driver that stops working in an attempt to reset the device, and a resource driver 302 should handle such an occurrence correctly. After an "activate" and "deactivate" sequence, the resource driver 302 and the hardware should return to a state that is identical to that before activation. For this reason, hardware, threading, and/or network or other communications initialization should not occur in the constructor, but in "activate." Shutdown should occur in "deactivate." The reading of the resource configuration 408 should occur in "activate" and use the parameters in the resource configuration 408 to set the resource driver to the appropriate state. The "is_active" method can return a "true" indication if activation completed successfully, otherwise it can return "false." It should be noted that the "is_active" method provides an accurate report of the driver's state. The resource container 402 that manages the resource driver 302 can use this information to determine whether the hardware is performing correctly and whether the driver is ready to accept requests for interface pointers.

In addition, the "activate" method can check "is_active" at the beginning of its execution, and if the resource driver 302 is already active, return a success indication relatively quickly, such as immediately. The "deactivate" method can determine if the resource driver 302 is not active. Note, that it is not an error to have repeated calls of "activate" or "deactivate;" the method's semantics are effectively "activate if not already active."

The following is sample code corresponding to the "activate" method for the example IRSensor resource driver. The illustrated sample code has been simplified for clarity, and it will be understood by the skilled practitioner that the illustrated source code can be supplemented with logging and/or error handling functions.

Figure 11:
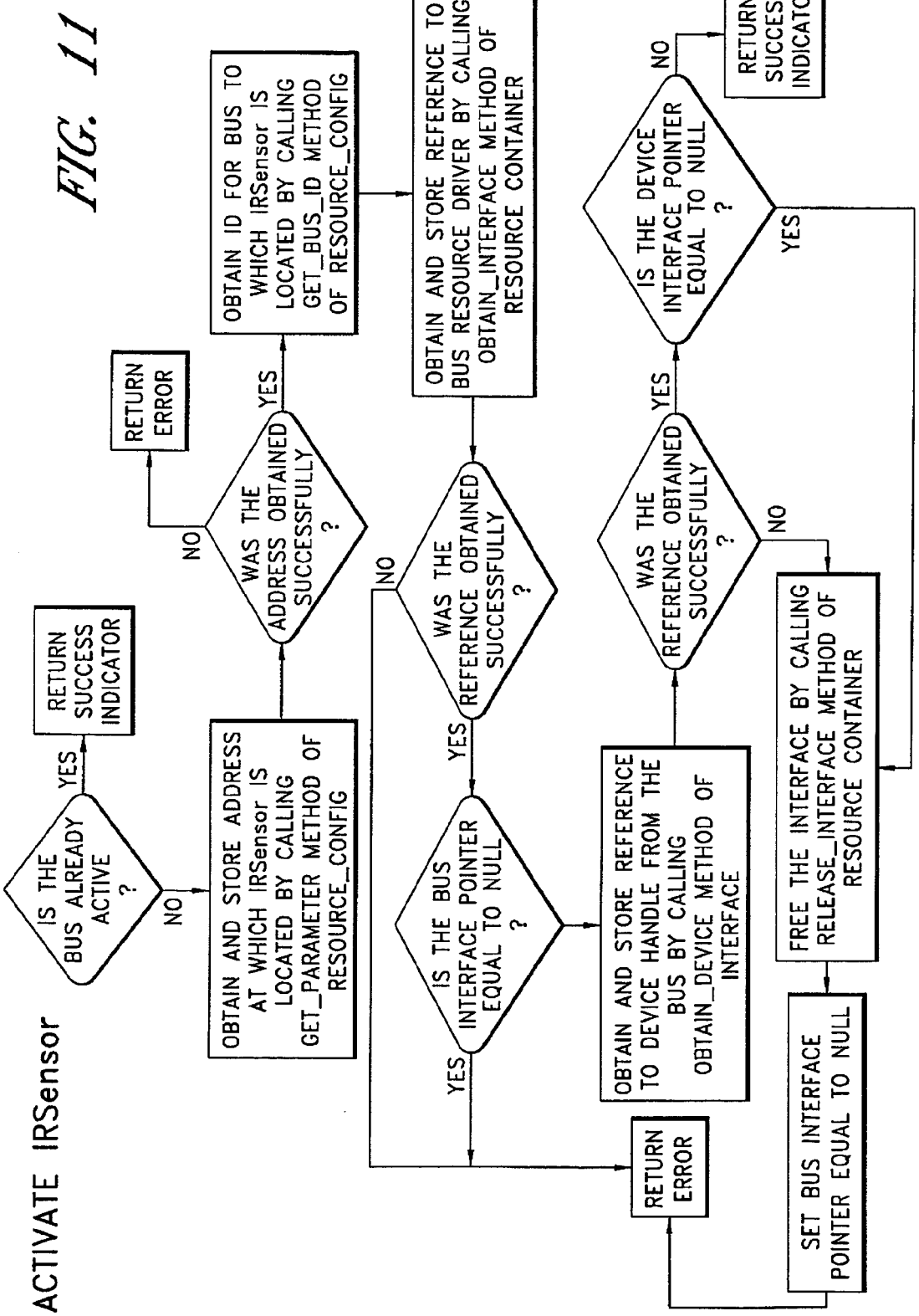

Code Block 2 (FIG. 11)

```
/// Activates the RCM bus.
Result IRSensor::activate ( )
{
    if (is_active ( ))
    {
        return (RESULT_SUCCESS);
    }
    // Get the bus address to which the sensor is connected.
    Result result = resource_config.get_parameter ("address",
&_address);
    if (result != RESULT_SUCCESS)
    {
        return result;
    }
    // Obtain the bus ID to which the ir sensor device is connected.
    String bus_id = ((DeviceConfig&)_resource_config).get_bus_id ( );
    // Obtain a reference to the bus id
    result = _resource_container.obtain_interface(
        _resource_ticket,
        bus_id.c_str ( ),
        IRCMBus::INTERFACE_ID,
        (IResource**)&_bus);
    if ((result != RESULT_SUCCESS) || (_bus == NULL))
    {
```

```
        return (result);
    }
    // Obtain a device handle.
    result = _bus->obtain_device (ERCM_DEVICE_UNKNOWN, _address, 0,
&_device);
    if ((result != RESULT_SUCCESS) || (_device == NULL))
    {
        _resource_container.release_interface (_resource_ticket, _bus);
        _bus = NULL;
    }
    return (result);
}
```

One objective of the "activate" method is to obtain a valid device handle to the IR sensor. To do so, it should obtain the address and bus upon which the IR sensor is coupled from the resource configuration 408 by calling the "get_parameter" and "get_bus_id" methods of resource_config. When the method has obtained the bus id, the method obtains a reference to the bus resource driver by calling the resource container's 402 "obtain_interface" method. When the bus's resource interface is obtained, the method calls that interface's "get_device" method to obtain a reference to the IR sensor's device handle. As long as this device handle is valid, the IR sensor can be accessed, and the resource can be considered active.

Figure 10:
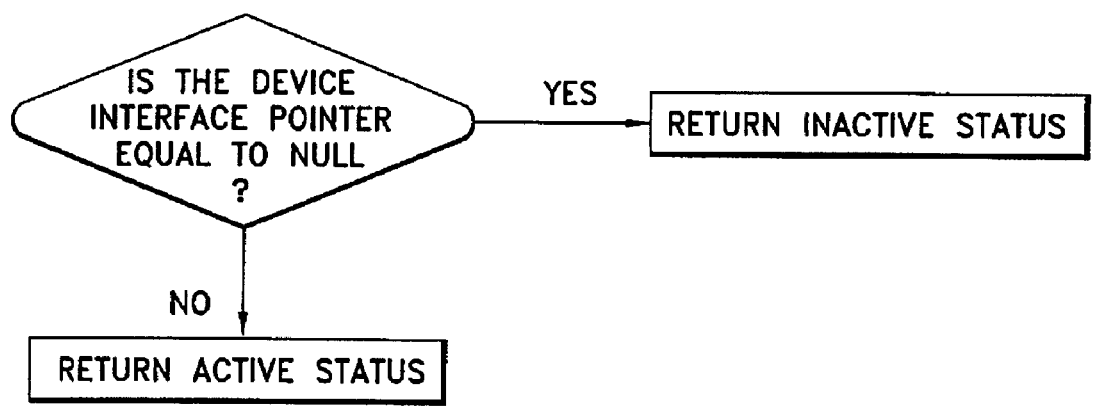

One implementation of the IRSensor resource driver's "is_active" method is:

Code Block 2a (FIG. 10)

```
/// Returns if the bus is active.
bool IrSensor::is_active ( )
{
    return (_device != NULL);
} // end is_active( )
```

Figure 12:
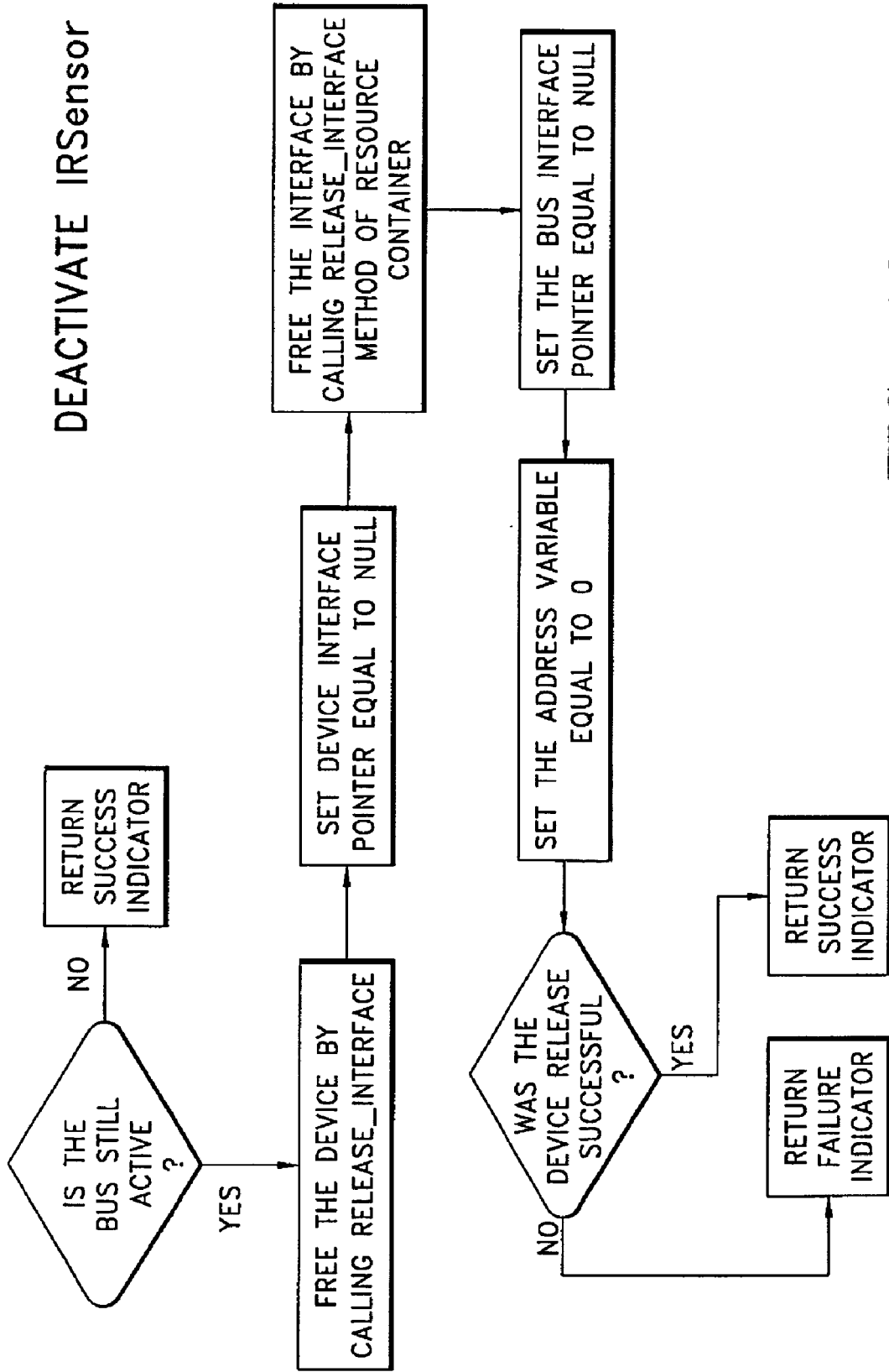

One example of source code corresponding to the "deactivate" method is as follows:

Code Block 3 (FIG. 12)

```
/// Deactivates the RCM bus.
Result IRSensor::deactivate ( )
{
    Result result = RESULT_SUCCESS;
    if (!is_active ( ))
    {
        return (RESULT_SUCCESS);
    }
    // Releasing the device interface.
    result = _bus->release device (_device);
    _device = NULL;
    // Release the bus interface.
    if (_resource_container.release_interface (_resource_ticket, _bus)
!= RESULT
_SUCCESS)
    {
        result = RESULT_FAILURE;
    }
    _bus = NULL;
    _address = 0;
    return (result);
} // end deactivate( )
```

The "deactivate" method cleans up by releasing the device and bus interfaces. The "deactivate" method also reset the_device and_bus interface pointers to NULL and_address to 0, to return to a state before the "activate" method was called. This sample code also demonstrate the built in reference counting of the illustrated embodiment of the HAL 202 objects. The "release_interface" call effectively deletes the bus and device objects when those objects are not referenced by any other object.

Obtaining Interfaces

For a resource driver 302 to be useful, it should expose a well-known resource interface 702 that other software components may access. The "obtain_interface" method described below illustrates one method that can perform that function. Resource drivers 302 are protected inside a resource container 402, so that when a component desires a resource interface 702 is implemented by a certain resource driver 302, it should make the request through the resource container 402. The container's "obtain_interface" method verifies that the resource driver 302 is active and then calls the resource driver's 302 "obtain_interface" method with the requested resource interface 702.

The driver should then determine if the requested resource interface 702 is supported and return a pointer to the requested resource interface 702. If the requested resource interface 702 is not supported, the call should return RESULT_NOT_IMPLEMENTED. If the resource interface 702 is returned, "obtain_interface" should call the resource driver's 302 "add_ref" method because a client now has a reference to the resource driver 302 and is responsible for releasing it through the resource container 402 when done. In addition to the interface pointer, the "obtain_interface" method outputs a reservation count, as described in connection with Advantage I(e) of the HAL's 202. In the example below, the IRSensor resource driver allows for unlimited access to the IRangeSensor resource interface, the only one it implements, so the reservation count is set to 0.

Figure 13:
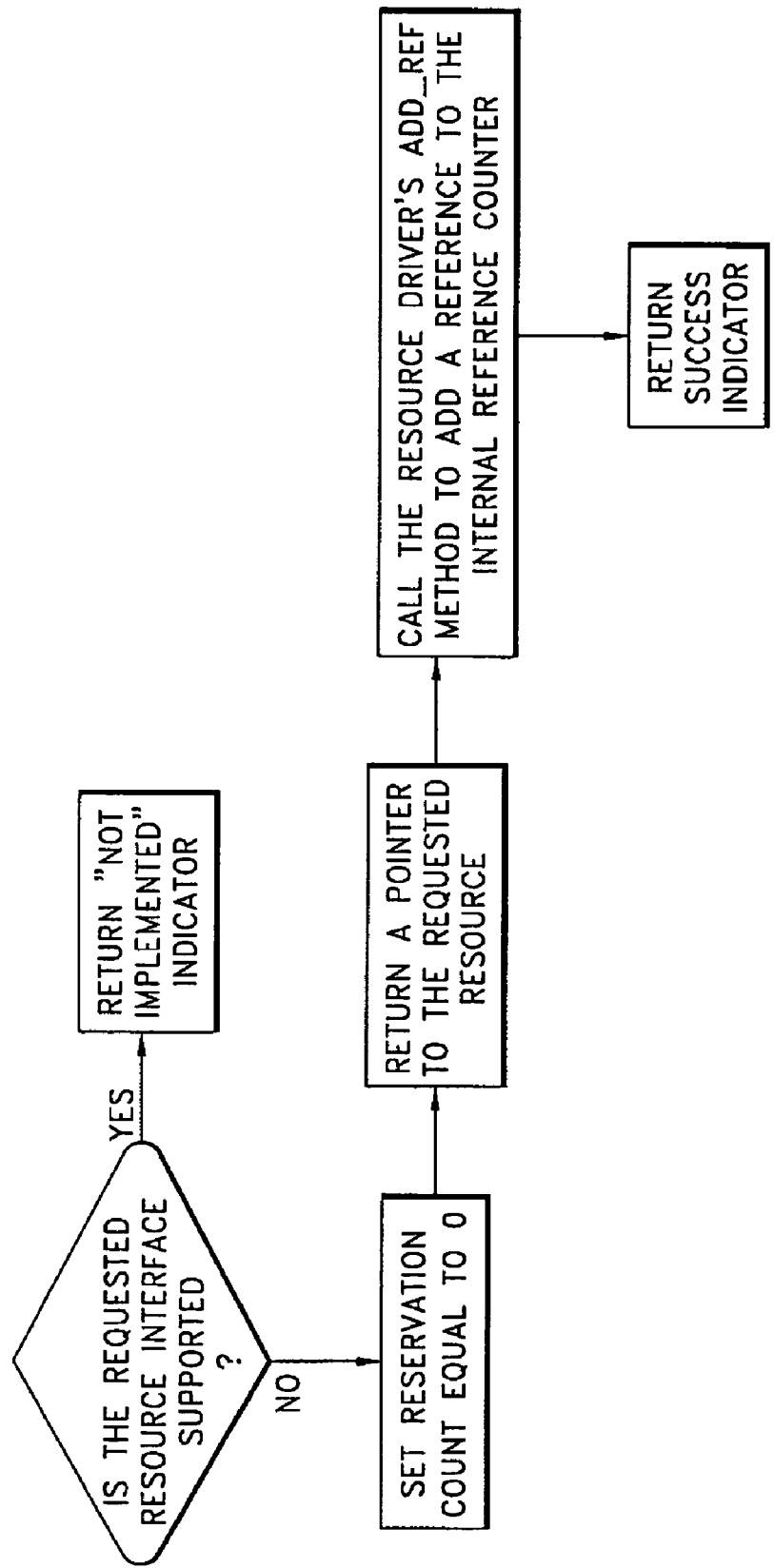

Code Block 4 (FIG. 13)

```
Result IrSensor::obtain_interface (TicketId owning_token,
                                   const char* interface_name,
                                   IResource** resource_interface,
                                   unsigned& reservation_count)
{
    if (strcmp (interface_name, IRangeSensor::INTERFACE_ID) == 0)
    {
        reservation_count = 0;
    }
    else
    {
        return (RESULT_NOT_IMPLEMENTED);
    }
    *resource_interface = this;
```

-continued
```
    add_ref ( );
    return (RESULT_SUCCESS);
} // end obtain_interface( )
```

In the illustrated embodiment, the IRSensor interface supports only the IRangeSensor interface, so it only needs to determine if the interface_name parameter matches the constant IRangeSensor::INTERFACE_ID. It will be understood that a resource driver 302 can also support more than one resource interface 702, and in this case, the "obtain_interface" method can check the interface_name parameter with the id of a supported resource interface 702 and return the proper interface reference when a match is found.

The resource interface 702 defines methods relevant to the operation of the encapsulated resource 304. The IRangeSensor resource interface in the current example implements the following methods:

Code Block 5

```
/**
 * Obtains a distance reading from the sensor.
 */
virtual Result get_distance_reading (TicketId ticket, Timestamp&
timestamp,  double& distance) = 0;
/**
 * Obtains the raw, unprocessed reading from the sensor.
 */
virtual Result get_raw_reading (TicketId ticket, Timestamp& timestamp,
double& distance) = 0;
/**
 * Set the raw, unprocessed reading for the sensor.
 */
virtual Result set_raw_reading (TicketId ticket, Timestamp timestamp,
double distance) = 0;
```

These methods illustrate typical operations for a range sensor. The "get_distance_reading" method returns a reading in real-world units processed from the raw readings of the sensor. The "get_raw_reading" method returns a raw reading from the sensor.

Figure 14:
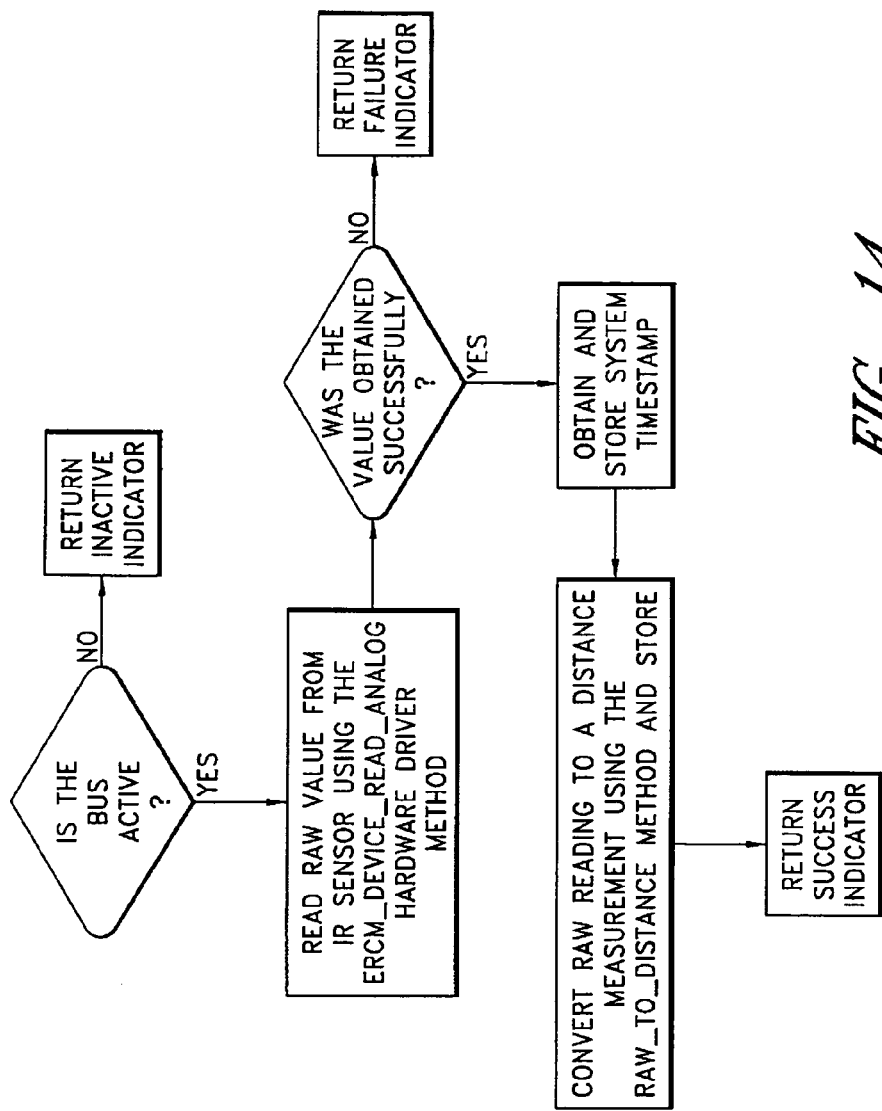

One example of source code corresponding to a sample implementation of the get_distance_reading method for the sample IRSensor resource driver is provided below:

Code Block 6 (FIG. 14)

```
/**
 * @brief  Obtains a distance reading from the sensor.
 *
 * @see  IRangeSensor::get_distance_reading( )
 **/
Result IRSensor::get_distance_reading (TicketId ticket,
Timestamp&
timestamp, double& distance)
{
    if (!is_active ( ))
    {
        return (RESULT_NOT_ACTIVE);
    }
    uint16_t raw;
    if (ercm_device_read_analog (_device, _address, &raw) !=
ERCM_RESULT_SUCCESS)
    {
        return (RESULT_FAILURE);
    }
    timestamp = Platform::get_timestamp ( );
    distance = raw_to_distance
    ((double) raw * IR_VOLT_FACTOR);
    return (RESULT_SUCCESS);
} // end get_distance_reading( )
```

The illustrated "get_distance_reading" method verifies that the resource driver 302 is active before proceeding. The "get_distance_reading" method then uses a hardware driver method "ercm_device_read_analog," to access this particular type of device to read the raw value from the IR sensor, passing along the sensor's_device reference and _address value that were obtained earlier by the "activate" method. A timestamp value for the reading is obtained, followed by a "raw_to_distance" method, which converts the raw reading to a distance reading. The converted distance value is then stored to the outgoing distance parameter, and a RESULT_SUCCESS value is returned.

Figure 15:
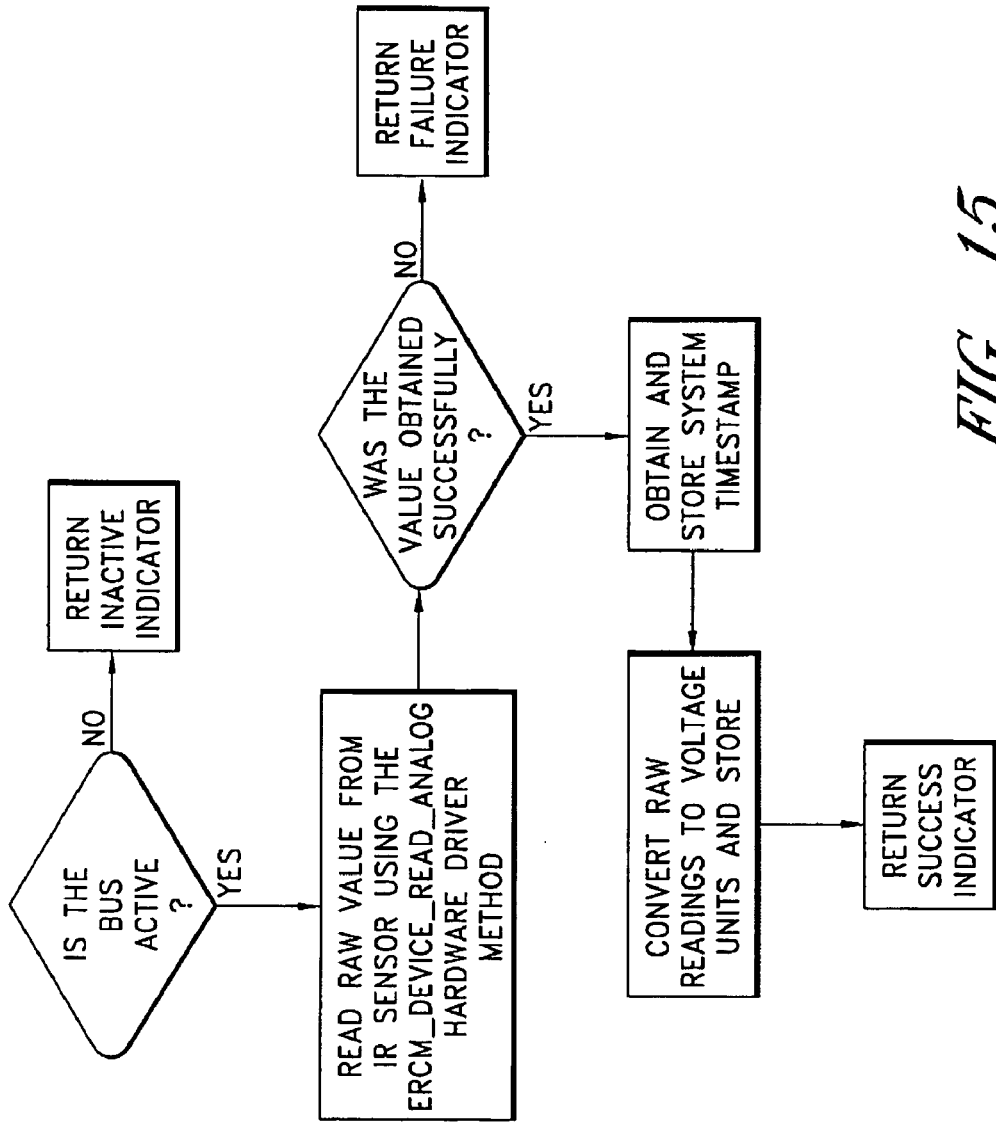

One embodiment of the IRSensor's implementation of the "get_raw_reading" method is provided below:

Code Block 7 (FIG. 15)

```
/**
 * @brief  Obtains the raw, unprocessed reading from the sensor.
 *
 * @see  IRangeSensor::get_raw_reading( )
 **/
Result IRSensor::get_raw_reading (TicketId ticket, Timestamp&
timestamp, double& dis
tance)
{
    if (!is_active ( ))
    {
        return (RESULT_NOT_ACTIVE);
    }
    uint16_t raw;
    if (ercm_device_read_analog (_device, 0, &raw) !=
ERCM_RESULT_SUCCESS)
    {
        return (RESULT_FAILURE);
    }
    timestamp = Platform::get_timestamp ( );
    distance = (double)raw * IR_VOLT_FACTOR;
    return (RESULT_SUCCESS);
} // end get_raw_reading( )
```

Note that this implementation is almost the same as the get_distance_reading, except that instead of converting the raw reading to a distance, the reading is converted to voltage units, which corresponds to raw form of the particular IR sensor used.

(Note: there is no Code Block 8 herein.)

The following describes in greater detail how higher-level software can utilize resource drivers 302 to create robotic behaviors. One example of a robotic behavior is to have the robot move forward a certain distance at a desired velocity. To accomplish this, the behavior should be able to determine whether the robot is moving forward at the desired velocity, should be able to periodically determine the distance moved, and should be able to stop the robot when the robot has moved the desired distance.

In one embodiment, this behavior uses two different resource interfaces 702 provided by the HAL 202: the drive system resource interface and the odometry resource interface. The drive system resource interface provides a "move_and_turn" method which allows the behavior to specify a linear velocity. One embodiment of the method also permits the setting of an angular velocity, but in the case of moving forward, the angular velocity can be set to 0.

In one embodiment, the odometry resource interface has a "get_Position" method, which returns the current position of the robot in a Position structure which contains the robot's position in Cartesian coordinates (x, y), along with the robot's orientation (θ).

The behavior begins by requesting references to these two resource interfaces 702 from the HAL 202 by calling the resource container's 402 "obtain_interface" method, as discussed earlier in connection with FIG. 8. The resource container 402 returns the references to the drive system and odometry resource interfaces. The behavior then calls the odometry resource interface's "get_position" method to retrieve the robot's current position, which the behavior can store as the starting point of the motion. The behavior then calls the "move_and_turn" method of the drive system behavior to start moving the robot at the desired velocity. Then the behavior can start a loop in which it periodically checks the current position of the robot by calling the odometry resource's "get_position" method, and can use a standard square root distance formula to compute the distance between the current position and the starting position to see if the desired distance has been attained. When this is achieved, the behavior breaks out of the loop and calls the "move_and_turn" method of the drive system resource interface with 0 linear velocity and 0 angular velocity to initiate a stop. One example of a C++ implementation of this behavior is described below in Code Block 9.

Figure 16:
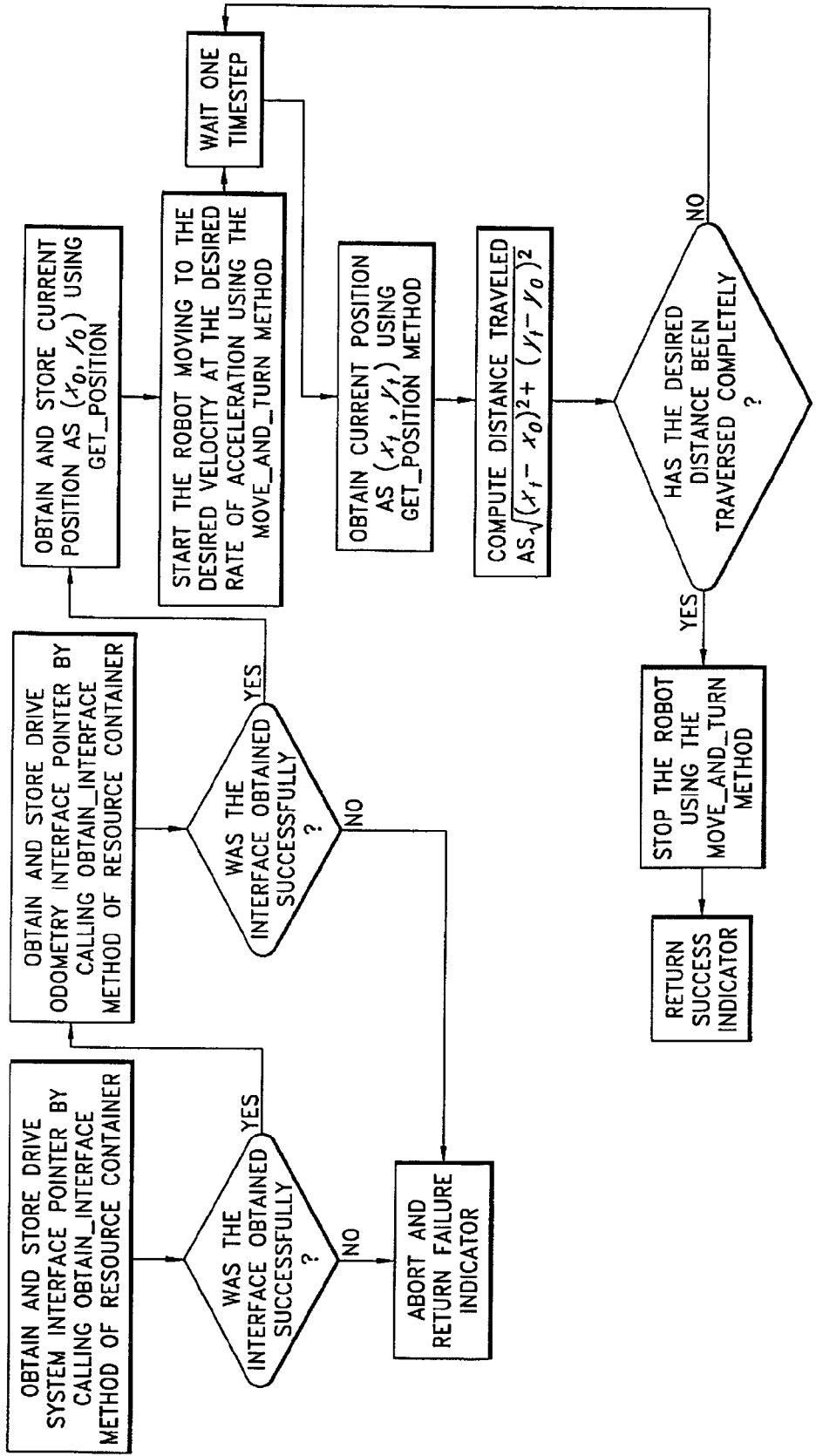

Code Block 9 (FIG. 16)

```
// Move forward behavior implemented as a function call.
// The drive system interface and odometry interface have
// the generic id's "drive_system" and "odometry",
// respectively. These id's are defined in the resource
// configuration.
bool MoveForward (TicketId ticket,
    IResourceContainer& resource_container,
    double distance, double velocity, double acceleration)
{
    // Declare require resource interface pointers.
    IDriveSystem* drive_system;
    IOdometry* odometry;
    // Try to obtain the drive system interface.
    Result result = resource_container.obtain_interface(ticket,
        "drive_system", IDriveSystem::INTERFACE_ID,
        &drive_system) ;
    if (result != RESULT_SUCCESS) {
        // Abort due to failure to obtain drive sytem interface.
        return false;
    }
    // Try to obtain the odometry interface.
    result = resource_container.obtain_interface (ticket,
        "odometry", IOdometry::INTERFACE_ID, &odometry);
    if (result != RESULT_SUCCESS) {
        // Abort due to failure to obtain odometry interface.
        return false;
    }
    // Get the starting position.
    Position start_position;
    odometry->get_position(ticket, &start_position);
    // Start the robot at the desired velocity.
    drive_system->move_and_turn (ticket,
    velocity, acceleration, 0, 0);
    // Start the loop to monitor the travel distance.
    double traveled;
    do {
        // A 100 millisecond delay between each loop iteration.
        Platform::sleep(100);
        // Get the current position.
        Position current_position;
        odometry->get_position(ticket, &current_position);
        // Compute the distance traveled using square root
        // distance formula.
        double dx = current_position.x − start_position.x;
        double dy = current_position.y − start_position.y;
        traveled = sqrt(dx * dx + dy * dy);
    }
    // stop the loop if the distance traveled is equal to
    // or greater than the desired distance.
    while (traveled >= distance);
    // stop the robot.
    drive_system->move_and_turn(ticket, 0, acceleration, 0, 0);
    return true;
}
```

Code Block 9 illustrates a higher-level behavior interacting with the HAL 202 to achieve a simple robotic operation, e.g., the moving forward if a certain distance. The illustrated operation uses two different resource interfaces 702. The behavior first obtains these resource interfaces with "obtain_interface" calls to the resource container 402. When the references to these interfaces are obtained, the behavior make use of the methods of these interfaces, namely "get_position" of IOdometry and "move_and_turn" of IDriveSystem, to achieve its objective. Advantageously due to the HAL 202, the illustrated code can run without regard to the specifics of the underlying robotics hardware. The resource configuration 402 describe the active hardware, and the HAL 202 uses the information in the resource configuration 408 to determine the correct implementations of these two methods to return to the behavior, so that when the behavior calls these methods, the active robot hardware abstracted by the HAL 202 will perform as intended.

Code block 10 illustrates one implementation of the "move_and_turn" method of a differential drive system with two motors.

Figure 17:
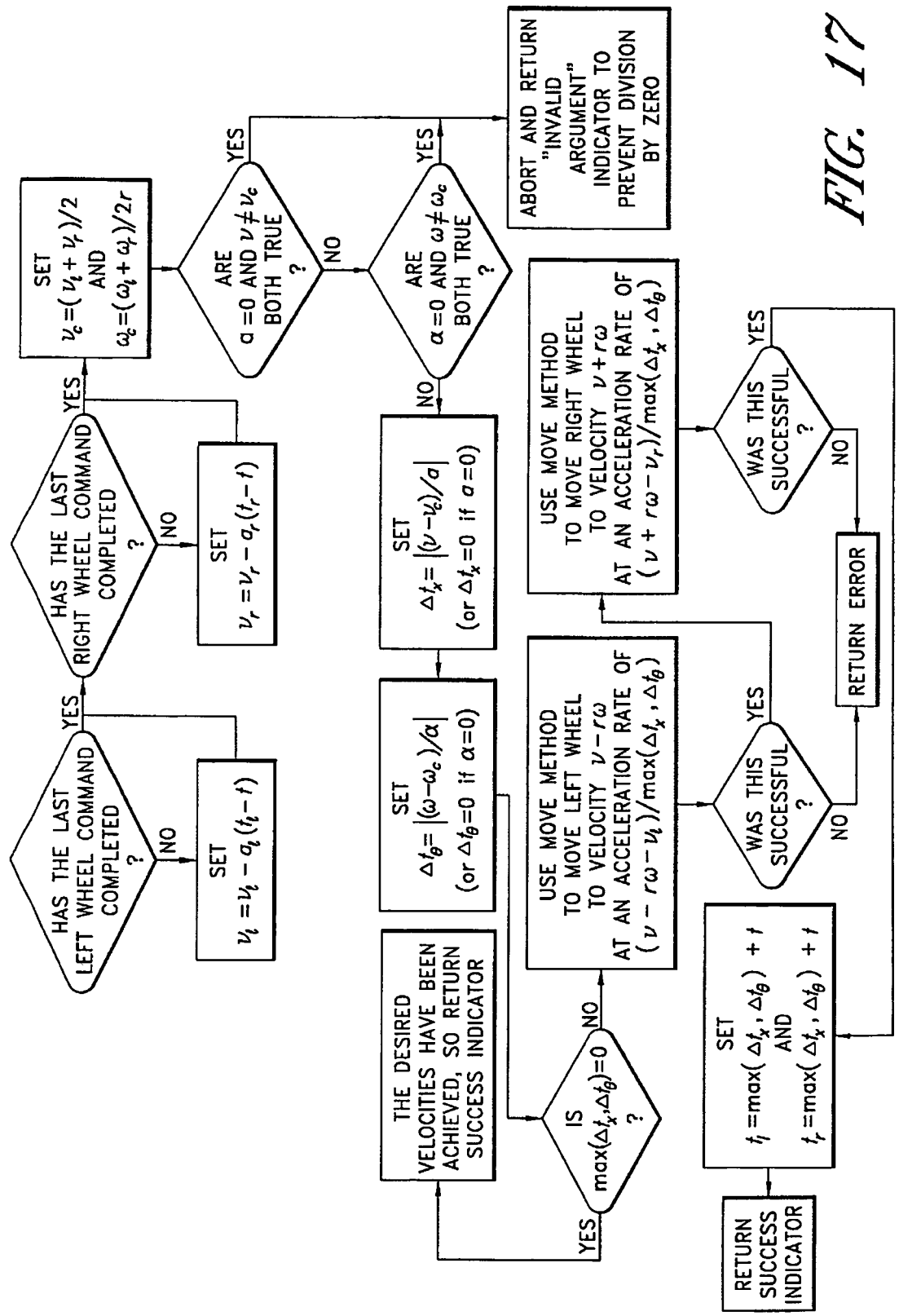

Code Block 10 (FIG. 17)

```
Result Diff2Drive::move_and_turn (TicketId ticket,
double velocity, double acceleration,
double angular_velocity, double
angular_acceleration)
{
    double current_left_velocity = _left_velocity;
    double current_right_velocity = _right_velocity;
    Timestamp now = Platform::get_timestamp( ) ;
    if (now < _last_left_command_done)
    {
        current_left_velocity −=
            _left_acceleration *
            (_last_left_command_done − now) ;
    }
    if (now < _last_right_command_done)
    {
        current_right_velocity −=
            _right_acceleration *
            (_last_right_command_done − now) ;
    }
    double current_velocity =
        0.5 * (current_left_velocity + current_right_velocity) ;
    double current_angular_velocity =
        0.5 * (current_right_velocity − current_left_velocity) /
            _turning_radius;
    double delta_velocity = velocity − current_velocity;
    double delta_angular_velocity = angular_velocity −
current_angular_velocity;
    // Avoid division by zero.
```

-continued

```
    if (acceleration = = 0.0 && delta_velocity != 0.0 ||
        angular_acceleration = = 0.0 &&
        delta_angular_velocity != 0.0)
    {
        return RESULT_INVALID_ARGUMENT;
    }
    // Adjust accelerations so left and right motors reach their
    // final velocities at the same time.
    double linear_interval =
        acceleration = = 0.0 ?
            0.0 : fabs (delta_velocity / acceleration) ;
    double angular_interval =
        angular_acceleration = = 0.0 ?
            0.0 : fabs
                (delta_angular_velocity / angular_acceleration) ;
    double interval =
        linear_interval > angular_interval ? linear_interval :
angular_interval;
    if (interval = = 0.0)
    {
        // This can only happen if we are already at the desired
velocities.
        return RESULT_SUCCESS;
    }
    // turning_radius computed during activate call using
    // distance between wheels read from resource configuration.
    double arc_velocity = angular_velocity * _turning_radius;
    _left_velocity = velocity − arc_velocity;
    _right_velocity = velocity + arc_velocity;
    _left_acceleration = (_left_velocity − current_left_velocity) /
interval;
    _right_acceleration =
        (_right_velocity − current_right_velocity) /
interval;
    // Move the left wheel.
    Result result;
    result = _left_command−>move (ticket, _left_velocity,
_left_acceleration) ;
    if (result != RESULT_SUCCESS) {
        return result;
    }
    _last_left_command = Platform::get_timestamp ( ) ;
    _last_left_command_done = _last_left_command + interval;
    // Move the right wheel.
    result = _right_command−>move (ticket, _right_velocity,
_right_acceleration) ;
    if (result != RESULT_SUCCESS) {
        return result;
    }
    _last_right_command = Platform::get_timestamp ( ) ;
    _last_right_command_done =
    _last_right_command + interval;
    return (RESULT_SUCCESS) ;
} // end move_and_turn( )
```

Code block 10 illustrates how the "move_and_turn" method for a differential drive system can take in convenient real-world parameters, such as linear velocity and angular velocity and their respective accelerations, and can compute the separate velocities on the left and right motors to produce the desired effect. FIG. 18 includes a chart for referencing variables in the flowchart of FIG. 17. This is representative of the functionality of a resource interface 702. It will be understood that the details of the implementation of these methods provided by the HAL 202 can vary with the underlying hardware. For example, the implementation of a "move_and_turn" method for a drive system using two motors to drive two set of legs will differ substantially from the above code for a differential drive system. However, by indicating in the resource configuration 408 which drive system is active, the HAL 202 advantageously provides higher-level software with the correct implementation, and the higher-level software is effectively isolated from the peculiarities specific to particular robots.

Implemented Resource Interfaces

A non-exhaustive list of resource interfaces 702 that can be implemented by one embodiment of the HAL 202 is provided below. It will be understood that additional resource interfaces 702 can being added. The resource interfaces are organized into general categories for readability.

Audio Category

Preferably the HAL 202 abstracts for a very broad range of devices, including those devices which are supported in conventional non-robotic platforms. Audio resource abstractions permit higher-level software to interact with sound devices attached to the robot, such as microphones, digital synthesizers, speakers, etc. Using object oriented design, the audio resources can be structured in the following class hierarchy:

IResource
      IAudioBase
         IAudioPlay
         IAudioRecord
         IAudioLevel IAudioBase allows the specification of digital audio parameters, such as mono or stereo, sampling rate, block size, number of audio channels, and the enumeration and selection of available audio devices.

IAudioPlay can be used to play digital audio.

IAudioRecord can be used to record digital audio.

IAudioLevel can used to detect general ambient noise volume in the environment around the robot. The IAudioLevel can provide a sensory input that can be used by higher level software components to react to sound. For example, a security behavior may be configured to react to a certain ambient volume level by sounding an "Intruder Alert."

Visual Category

Resources in the visual category abstracts visual sensors like cameras. They allow the specification of various video and still frame parameters, like image size, color depth and format, video codec, video frame rate, compression quality. In one embodiment, the resource hierarchy is as follows:

IResource
      ICamera
         ICamera Group

The ICamera resource can retrieve still frames and video from a single camera. Frames retrieved can be stored as to raw raster data of various color formats or in a compressed format such as JPEG. One embodiment of an ICameraGroup resource abstracts the interaction with multiple cameras, taking into account the relative position, orientation, and spacing of more than one camera to enable the synchronized capture of multiple images and video for applications such as stereo vision or panorama creation.

Sensor Category

The sensor category contains resource abstractions of various types of non-visual sensory devices. The variety of available sensors can be quite large, from relatively high-tech and high-cost sensors such as laser range finders to relatively simple and low cost sensors, such as sonar or bump-switch sensors. The sensor resources abstract away from the difficulty of dealing with this variety by grouping sensors into functional categories and providing a relatively simple and uniform interface to each category. The class hierarchy follows the functional category breakdown and is described in further detail below:

IResource
  IBumpsensor
  IRangeSensor
  IspatialSensor

The IBumpsensor resource can abstract sensors that detect a physical contact between the sensor and some foreign object. Sensors in this category include various switch sensors.

The IRangeSensor resource can abstract sensors that detect the presence of a foreign object within a finite distance of the sensor. One embodiment of the IRangeSensor resource returns a single distance reading. The resource describes the physical limitations of certain range sensors, such as ambiguous or dead zones, minimum range, and maximum range. The readings returned from the sensors are converted to distance units and can be filtered to minimize errors by the resource implementation. Sensors in this category includes most IR and sonar sensors.

The ISpatialSensor resource abstracts sensors which detect the presence of foreign objects in a relatively wide area, and is capable of returning multiple readings at once. A rotating laser range finder is an example of a sensor in this category.

Emotions
  IFace

The IFace resource interface supports the manipulation of 3D-rendered faces based on emotion parameters. The face can be changed to reflect facial gestures such as smiles, frowns, etc.

Locomotion
  IMotorCommand
  IMotorQuery
  IDriveSystem
  IOdometry

The IMotorCommand resource interface encapsulates the control of a single motor, such as setting the motor's rotational velocity and acceleration.

The IMotorQuery resource interface encapsulates the queries that can be made regarding the state of a single motor, such as the motor position or velocity.

The IDriveSystem resource interface can abstract a drive system that moves the entire robot. This resource interface allows other software components to control the motion of the robot based on convenient real-world parameters such as linear and angular velocities. Its implementations translate these simple commands to the corresponding control signals of the underlying locomotion hardware, which can correspond to a broad variety of hardware such as the two motors of a differential drive system or the complex motion of multiple robot legs.

Display
  IImageDisplay

The IimageDisplay resource interface encapsulates the ability to display an image in a graphical user interface window.

Input
  IJoystick
  ISwitchDevice

The IJoystick resource interface encapsulates input from a joystick.

The ISwitchDevice resource interface encapsulates input from an external multi-position hardware switch.

Manipulator
  IGripper

The IGripper resource interface encapsulates the operations of a gripper, including queries of the gripper's state and commands to open and to close a gripper.

Speech
  ISpeechRecognizer
  ISpeechTTS

The ISpeechRecognizer resource interface abstracts a speech recognition interface.

The ISpeechTTS resource interface can include methods to support speech synthesis capability from text input.

Utility
  IPollable
  ITransactable

The IPollable resource interface encapsulates the polling operation of selected resources. When a resource interface 702 should be polled, the resource interface 702 also implements this interface to indicate how the polling should be done and at what interval.

The ITransactable resource interface can support some resource drivers, and is configured to send multiple commands and/or queries as part of a single transaction.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A hardware abstraction layer (HAL) in a robot software architecture, the HAL comprising:
   software interfaces to higher-level software, wherein the software interfaces are configured to communicate with the higher-level robotic software with real-world measurements relating to robot interaction with an environment;
   a resource configuration that provides an indication of available resources of the higher-level software;
   a plurality of resource drivers, wherein at least a portion of the resource drivers correspond to the available resources in the resource configuration, wherein at least two of the resource drivers overlap in functionality, where only one of the at least two resource drivers has a corresponding resource available, where a resource driver for an available resource is configured to translate between real-world measurements for the robot and device-level measurements for a device; and
   an interface to lower-level device drivers, wherein the lower-level device drivers communicate with corresponding hardware at a device level, and where the interface to lower-level device drivers communicates to the higher-level software via a resource driver.

2. The HAL as defined in claim 1, wherein the resource configuration further comprises an indication of where a device is structurally coupled to the robot.

3. The HAL as defined in claim 1, wherein the higher-level software includes at least one selected from the group consisting of a planner, an application, a behavior, and a task.

4. The HAL as defined in claim 1, wherein the higher-level software comprises at least one of a planner, an application, a behavior, or a task.

5. The HAL as defined in claim 1, wherein a device driver corresponds to a motor driver and wherein a corresponding resource driver uses a wheel diameter and a gear ratio to compute speed given a motor angular velocity such that the resource driver translates between motor angular velocity for the motor driver and linear velocity for the high-level software.

6. The HAL as defined in claim 1, where the resource drivers reside in an application program interface (API) layer between the higher level software and the lower-level device drivers.

7. A hardware abstraction layer (HAL) in a robot for robot control software, the HAL comprising:
   means for providing a plurality of resource drivers for the robot, where the plurality of resource drivers includes resource drivers for which no corresponding hardware is present on the robot;
   means for detecting a hardware configuration for the robot;
   means for automatically detecting resources that are available on the robot based on the detected hardware configuration;
   means for receiving a request from the robot control software to use a type of resource;
   means for automatically selecting a resource from the available resources that corresponds to the type of resource requested by the robot control software;
   means for exchanging a first information with the robot control software, where the first information is related to use of the selected resource and is provided in a unit of measure that is related to a robot;
   means for exchanging a second information with a low-level device driver corresponding to the resource, where the second information is related to the use requested by the robot control software, where the second information is provided in a unit of measure that is related to a corresponding device, and where the second information is different than the first information; and
   means for converting between the first information and the second information based on the detected configuration of the robot.

8. A hardware abstraction layer (HAL) in a robot software architecture, the architecture comprising higher-level robotic software for interacting with a plurality of resources, the HAL comprising:
   a set of one or more resource drivers, the set comprising at least a first resource driver adapted to communicate with a first resource from the plurality of resources, wherein the first resource driver is adapted to support a plurality of functions associated with the first resource;
   a set of two or more resource interfaces, each resource interface adapted to communicate with the higher-level robotic software and with the first resource driver, the set of two or more resource interface comprising:
      a) a first resource interface for invoking a first set of one or more functions of the plurality of functions supported by the first resource driver; and
      b) a second resource interface for invoking a second set of one or more functions of the plurality of functions supported by the first resource driver, wherein the first set of functions is different than the second set of functions;
   wherein the higher-level robotic software communicates with the first resource via one or more selected interfaces of the plurality of resource interfaces, and the first resource communicates with the higher-level robotic software via the first resource driver.

9. The HAL as defined in claim 8, further comprising a resource container for regulating access to each of the plurality of resource interfaces.

10. The HAL as defined in claim 8, further comprising a driver table comprising a reference to each of the one or more resource drivers.

11. The HAL as defined in claim 10, wherein the first resource interface and the second resource interface are invoked with a method associated with the first resource driver.

12. The HAL as defined in claim 8, wherein the HAL is further adapted to select from the plurality of resource interfaces based on a type of resource requested by the higher-level robotic software and the functions associated with each of the plurality of resource interfaces.

13. The HAL as defined in claim 8, wherein the resource comprises a sensor, the first set of one or more functions comprises imaging, and the second set of one or more functions comprises range sensing.

14. The HAL as defined in claim 8, wherein the resource is selected from the group consisting of: a hardware resource, a software resource, and an operating system resource.

15. The HAL as defined in claim 8, wherein the first resource interface and the second resource interface are configureable to be active at the same time.

* * * * *